(12) United States Patent
Kondo et al.

(10) Patent No.: US 8,831,103 B2
(45) Date of Patent: Sep. 9, 2014

(54) IMAGE PROCESSING APPARATUS AND METHOD

(75) Inventors: Kenji Kondo, Tokyo (JP); Junichi Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 13/120,685

(22) PCT Filed: Oct. 2, 2009

(86) PCT No.: PCT/JP2009/067224
§ 371 (c)(1),
(2), (4) Date: Jun. 10, 2011

(87) PCT Pub. No.: WO2010/038857
PCT Pub. Date: Apr. 8, 2010

(65) Prior Publication Data
US 2011/0243234 A1    Oct. 6, 2011

(30) Foreign Application Priority Data
Oct. 2, 2008    (JP) ................................. 2008-257051

(51) Int. Cl.
| H04N 7/32 | (2006.01) |
| H04N 19/61 | (2014.01) |
| H04N 19/82 | (2014.01) |
| G06K 9/36 | (2006.01) |
| G06K 9/40 | (2006.01) |

(52) U.S. Cl.
CPC ............ *H04N 19/00781* (2013.01); *G06K 9/36* (2013.01); *H04N 19/00896* (2013.01)
USPC ...................... 375/240.16; 382/238; 382/275

(58) Field of Classification Search
CPC ............. H04N 7/32; H04N 7/40; H04N 7/12; H04N 7/01; G06K 9/36; G06K 9/40
USPC .......... 375/240.3–240.26, E07.243, E07.123, 375/240.3–240.26, 240.12, 240.16, 240.24; 382/238, 275
See application file for complete search history.

(56) References Cited

U.S. PATENT DOCUMENTS

| 6,900,846 B2 * | 5/2005 | Lee et al. ....................... 348/459 |
| 2003/0228067 A1 * | 12/2003 | Miyake et al. ................. 382/275 |

(Continued)

FOREIGN PATENT DOCUMENTS

| JP | 5 244585 | 9/1993 |
| JP | 2000 175192 | 6/2000 |

(Continued)

OTHER PUBLICATIONS

U.S. Appl. No. 13/389,474, filed Feb. 8, 2012, Kondo, et al.

(Continued)

*Primary Examiner* — Dave Czekaj
*Assistant Examiner* — Dramos I Kalapodas
(74) *Attorney, Agent, or Firm* — Oblon, Spivak, McClelland, Maier & Neustadt, L.L.P.

(57) ABSTRACT

The present invention relates to an image processing apparatus and method in which a motion vector corresponding to the difference between the coordinates of an encoding target block and the coordinates of a reference block is calculated, a horizontal-direction fine adjustment filter Hh and a vertical-direction fine adjustment filter Hv are generated and applied to the reference block, which is further assigned to the encoding target block in order to generate a motion-compensated prediction image.

15 Claims, 21 Drawing Sheets

(56) References Cited

U.S. PATENT DOCUMENTS

| | | | |
|---|---|---|---|
| 2004/0046891 A1* | 3/2004 | Mishima et al. | 348/459 |
| 2004/0076333 A1 | 4/2004 | Zhang et al. | |
| 2005/0053142 A1* | 3/2005 | Holcomb et al. | 375/240.16 |
| 2006/0067405 A1* | 3/2006 | Hormis et al. | 375/240.16 |
| 2006/0256238 A1* | 11/2006 | Mishima et al. | 348/459 |
| 2007/0230571 A1 | 10/2007 | Kodama | |
| 2009/0022220 A1* | 1/2009 | Vatis et al. | 375/240.12 |
| 2009/0110077 A1* | 4/2009 | Amano et al. | 375/240.16 |
| 2009/0116759 A1* | 5/2009 | Suzuki et al. | 382/238 |
| 2010/0135398 A1* | 6/2010 | Wittmann et al. | 375/240.16 |

FOREIGN PATENT DOCUMENTS

| | | |
|---|---|---|
| JP | 2004 147328 | 5/2004 |
| JP | 2007 274479 | 10/2007 |

OTHER PUBLICATIONS

U.S. Appl. No. 13/121,027, filed Mar. 25, 2011, Kondo, et al.
U.S. Appl. No. 13/130,682, filed May 23, 2011, Kondo.
U.S. Appl. No. 13/131,814, filed May 27, 2011, Kondo, et al.
Wedi, T. et al., " Motion- And Aliasing-Compensated Prediction for Hybrid Video Coding", IEEE Transactions on Circuits and Systems for Video Technology, vol. 13, No. 7, pp. 577-586, (Jul. 2003).
Yuri Vatis, et al. " Prediction of P- And B-Frames Using a Two-Dimensional Non-Separable Adaptive Wiener Interpolation Filter for H.264/AVC", Proposal, ITU—Telecommunications Standardization Sector Study Group 16 Question 6, Video Coding Experts Group (VCEG), 30$^{th}$ Meeting Hangzhou, Total pp. 13, (Oct. 23-27, 2006).
International Search Report issued Nov. 10, 2009 in PCT/JP09/067224 filed Oct. 2, 2009.
U.S. Appl. No. 13/515,878, filed Jun. 14, 2012, Kondo.
U.S. Appl. No. 13/514,354, filed Jun. 7, 2012, Kondo.
U.S. Appl. No. 13/515,467, filed Jun. 12, 2012, Kondo.
U.S. Appl. No. 13/502,384, filed Jul. 3, 2012, Kondo.
Office Action issued Dec. 20, 2012 in Japanese Patent Application No. 2010-531922.

\* cited by examiner

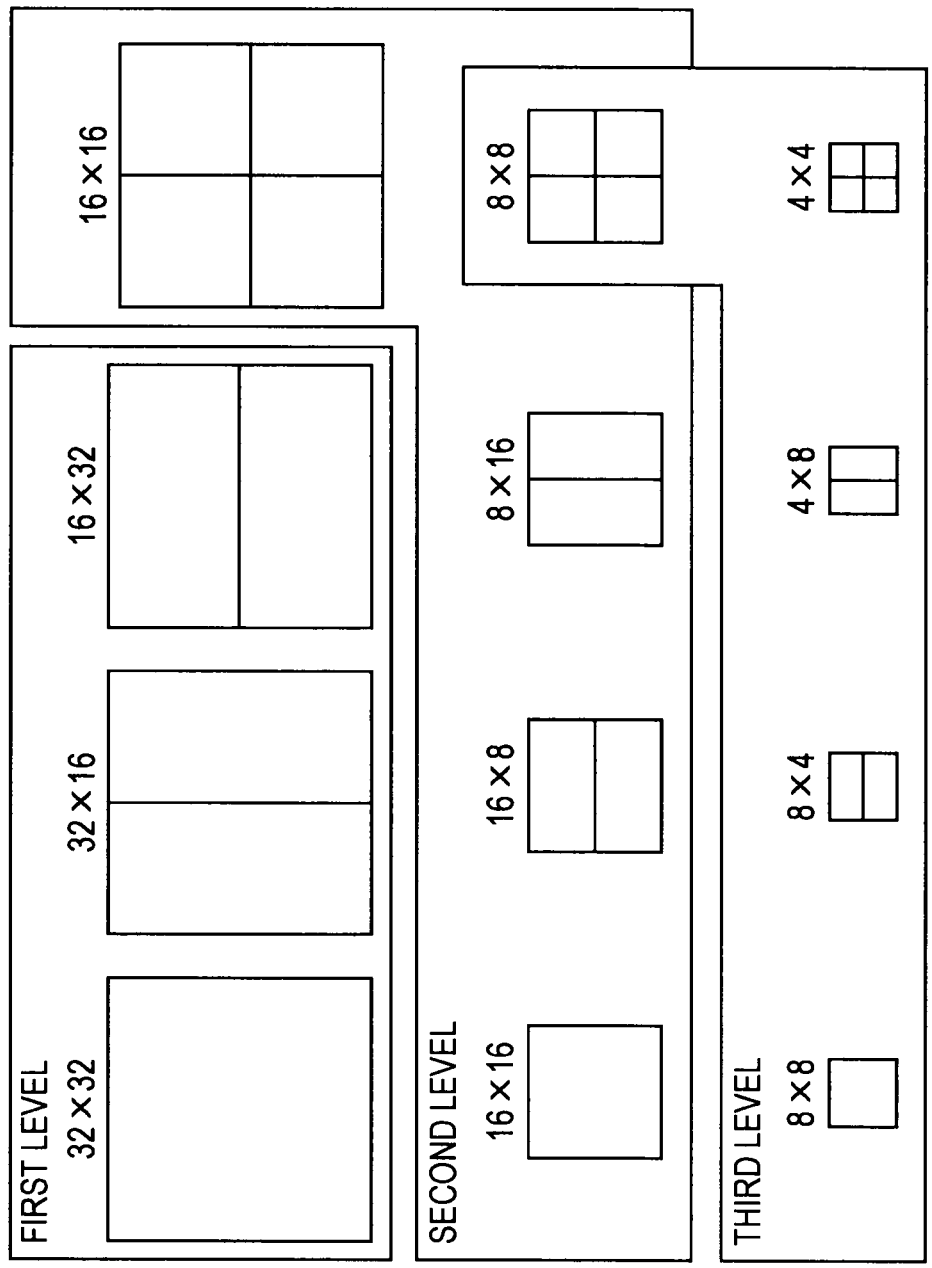

IMAGE PROCESSING APPARATUS AND METHOD

TECHNICAL FIELD

The present invention relates to image processing apparatuses and methods, and more particularly, to an image processing apparatus and method suitable for performing image compression-encoding processing including motion compensation processing.

BACKGROUND ART

Conventionally, as techniques for compression-encoding moving images, MPEG, H.26x, etc. using orthogonal transform, such as discrete cosine transform, and motion compensation are known.

MPEG2 is defined as a general-purpose image encoding method. MPEG2 is now widely used for a wide range of applications for professional use and for consumer use, as a technique that can support both the interlaced scanning images and progressive scanning images and that support both the standard-definition images and high-definition images and also standard specifications.

By the use of MPEG2, an amount of encoding (bit rate) of 4 to 8 Mbps are applied to, for example, interlaced scanning images having standard definition of 720×480 pixels, and an amount of encoding (bit rate) of 18 to 22 Mbps are applied to, for example, interlaced scanning images having high definition of 1920×1088 pixels, thereby making it possible to realize a high compression ratio and good image quality.

On the other hand, H.26x was initially developed as an image encoding technique for videoconferencing. For example, H26L requires a larger amount of computation for performing encoding and decoding than MPEG2 or MPEG4. However, H.26L is known to achieve a higher coding efficiency.

Also, as a part of the activities in MPEG4, standardization of a technique for realizing a higher coding efficiency is performed based on H.26L and also by incorporating functions that are not supported by H.26L. Such a technique is standardized as H.264 or MPEG-4 Part10 (Advanced Video Coding). This standardization is hereinafter referred to as the "AVC standards".

FIG. 1 illustrates an example of the configuration of an image encoding apparatus that performs compression-encoding on input moving images on the basis of the AVC standards and outputs image compression information (encoded signal) obtained as a result of compression-encoding.

This image encoding apparatus 10 includes an analog-to-digital converter (A/D) 11, an image rearrangement buffer 12, an adder 13, an orthogonal transformer 14, a quantization unit 15, a lossless encoder 16, a storage buffer 17, and a rate controller 26. The image encoding apparatus 10 further includes an inverse quantization unit 18, an inverse orthogonal transformer 19, an adder 20, a deblocking filter 21, a frame memory 22, an intra-prediction unit 23, and a motion-prediction/compensation unit 24.

In the image encoding apparatus 10, a moving image input as an encoding target (hereinafter referred to as an "input image") is converted into a digital signal by the A/D 11, and is input into the image rearrangement buffer 12. In the image rearrangement buffer 12, the order of pictures is rearranged in accordance with a GOP (Group of Pictures) structure used when the image is output, and the resulting image is supplied to the subsequent block.

If the image output from the image rearrangement buffer 12 is subjected to intra-coding, the encoding target image, which is output from the image rearrangement buffer 12, is supplied to the intra-prediction unit 23. In the intra-prediction unit 23, a prediction image is generated. Then, the generated prediction image and the encoding target image are supplied to the adder 13. A difference signal between the prediction image and the encoding target image is calculated, and is supplied to the orthogonal transformer 14.

In the orthogonal transformer 14, the output from the adder 13 is subjected to orthogonal transform (discrete cosine transform, Karhunen-Loeve transform, or the like), and a transform coefficient obtained as a result of orthogonal transform is quantized by the quantization unit 15. Note that the quantization rate used in the quantization unit 15 is controlled by the rate controller 26 in accordance with the storage capacity of the storage buffer 17. The quantized transform coefficient is supplied to the lossless encoder 16 and the inverse quantization unit 18.

In the lossless encoder 16, the quantized transform coefficient is subjected to lossless encoding (variable length coding, arithmetic coding, or the like), and the result is stored in the storage buffer 17 and is then output to the subsequent block as image compression information.

Meanwhile, in the inverse quantization unit 18, the quantized transform coefficient is subjected to inverse quantization, which corresponds to the quantization performed by the quantization unit 15, and is output to the inverse orthogonal transformer 19. In the inverse orthogonal transformer 19, inverse orthogonal transform, which corresponds to the orthogonal transform performed by the orthogonal transformer 14, is performed on the transform coefficient obtained as a result of inverse quantization. The result is then output to the adder 20.

In the adder 20, the inverse orthogonal transform result and the encoding target image are added so that a decoded image, which is an image obtained by encoding the encoding target image and by decoding it, is generated. The deblocking filter 21 removes blocking distortions from the generated decoded image, and then, the resulting image is stored in the frame memory 22.

In the intra-prediction unit 23, a prediction image corresponding to the encoding target image is generated, and also, information indicating an intra-prediction mode applied to each macroblock of the encoding target image is output to the lossless encoder 16. This information indicating the intra-prediction mode is encoded by the lossless encoder 16 as part of information described in the header of image compression information.

Note that in the case of H.264, as the intra-prediction modes, an intra 4×4 prediction mode, an intra 8×8 prediction mode, and an intra 16×16 prediction mode are defined for luminance signals. For color-difference signals, a prediction mode, which is independent of the prediction modes for the luminance signals, can be defined for each macroblock. For example, concerning the intra 4×4 prediction mode, one intra-prediction mode is defined for each 4×4 luminance block. Concerning the intra 8×8 prediction mode, one intra-prediction mode is defined for each 8×8 luminance block. Concerning the intra 16×16 prediction mode, one intra-prediction mode is defined for each macroblock. Also, for color difference signals, one prediction mode is defined for each macroblock.

If the image output from the image rearrangement buffer 12 is subjected to inter-coding, the encoding target image is input into the motion-prediction/compensation unit 24. At the same time, a decoded image output from the frame memory 22 is read out to the motion-prediction/compensation unit 24 as a reference image. Then, motion-prediction/compensation is performed on the encoding target image and the reference image, and a prediction image obtained as a result of motion-prediction/compensation is supplied to the adder 13. In the adder 13, the prediction image is converted into a difference signal between the encoding target image and the prediction image, and the difference signal is output to the orthogonal transformer 14. Operations performed by the blocks subsequent to the orthogonal transformer 14 are similar to those for intra-coding, and thus, an explanation thereof is omitted.

In the motion-prediction/compensation unit 24, simultaneously with the generation of the above-described prediction image, a motion vector of each macroblock is detected and is output to the lossless encoder 16. This motion vector is encoded by the lossless encoder 16 as part of information described in the header of image compression information.

Here, motion compensation performed in the motion-prediction/compensation unit 24 is described. Motion compensation is processing performed by assigning a portion of a decoded image stored in the frame memory 22 to a portion of an encoding target image. A motion vector detected by the motion-prediction/compensation unit 24 determines which portion of the decoded image is used for reference.

In order to improve the prediction precision, the motion vector is calculated with a precision using fractions, which are smaller than integers, such as ½ Pel, ¼ Pel, and so on. In this manner, in order to perform motion compensation with a fraction precision, it is necessary to newly set pixels between actual pixels of an image, i.e., at a position in which pixels do not exist, by interpolation processing.

An example of the case where the number of pixels is increased by interpolation is described below with reference to FIG. 2. FIG. 2 illustrates an example of the case where the number of pixels is increased in each of the vertical direction and in the horizontal direction to four times of the original number of pixels. In FIG. 2, the white circles represent the positions of actual pixels, and the white squares represent the positions of interpolation pixels.

Each interpolation pixel is interpolation-calculated by linear combination of a plurality of actual pixels, calculated interpolation pixels, and a predetermined filter coefficient, as expressed by, for example, the following interpolation equations.

$$b=(E-5F+20G+20H-5I+J)/32$$

$$h=(A-5C+20G+20M-5R+T)/32$$

$$j=(aa-5bb+20b+20s-5gg+hh)/32$$

$$a=(G+b)/2$$

$$d=(G+h)/2$$

$$f=(b+j)/2$$

$$r=(m+s)/2$$

Interpolation pixels aa, bb, s, gg, and hh are calculated by equations similar to the above-described equation for calculating the interpolation pixel b. Interpolation pixels cc, dd, m, ee, and ff are calculated by equations similar to the above-described equation for calculating the interpolation pixel h. Interpolation pixel c is calculated by an equation similar to the above-described equation for calculating the interpolation pixel a. Interpolation pixels i, k, and q are calculated by equations similar to the above-described equation for calculating the interpolation pixel d. Interpolation pixels e, g, and o are calculated by equations similar to the above-described equation for calculating the interpolation pixel r.

The above-described interpolation equations are employed in, for example, H.264 and AVC standards. These interpolation equations are realized by a FIR (Finite Impulse Response) filter having an even-numbered tap.

The motion-prediction/compensation unit 24 contains, instead of a FIR filter, an AIF (Adaptive Interpolation Filter) 25 that can adaptively change a filter coefficient in an interpolation equation for every frame. The interpolation processing is performed by the use of this AIF 25 so that aliasing influences or coding distortions are reduced, thereby decreasing motion compensation errors. The filter coefficients that are adaptively changed by the AIF 25 are output, together with motion vectors, to the lossless encoder 16. The filter coefficients are encoded and output as image compression information.

The AIF is disclosed in, for example, Non-Patent Documents 1 and 2.

CITATION LIST

Non Patent Literature

NPL 1: "Motion- and Aliasing-Compensated Prediction for Hybrid Video Coding" Thomas Wedi and Hans Georg Musmann, IEEE Transactions on circuits and systems for video technology, Vol. 13, No. 7, July 2003

NPL 2: "Prediction of P- and B-Frames Using a Two-dimensional Non-separable Adaptive Wiener Interpolation Filter for H.264/AVC" Yuri Vatis, Joern Ostermann, ITU-T SG16 VCEG 30th Meeting, Hangzhou China, October 2006

SUMMARY OF INVENTION

Technical Problem

In a case where an AIF is used for the motion-prediction/compensation unit 24, a filter coefficient of the AIF is also encoded and included in image compression information. If the filter coefficient is changed, for example, for every encoding target image, the amount of encoding does not present any problem. However, if, for example, an encoding target image is divided into a plurality of regions, and if a filter coefficient is adaptively generated for each region, the amount of encoding is increased.

The present invention has been made in view of the above-described background, and makes it possible to suppress an increase in the amount of encoding while realizing high-precision motion compensation.

Solution to Problem

An image processing apparatus according to a first aspect of the present invention includes: setting means for setting, as a decoded region, a region that is adjacent to a target block of a decoding target image, which is a target to be decoded, and that is decoded earlier than the target block, and for setting, as the reference region, a region whose positional relationship with a reference block of a reference image is the same as a positional relationship of the decoded region; calculating means for calculating a filter coefficient of a filter that converts pixel values of the reference region set by the setting means into pixel values of the decoded region set by the setting means; interpolating means for interpolating pixel values of the reference block by using an adjustment filter having the filter coefficient calculated by the calculating means; and generating means for generating a prediction image corresponding to the decoding target image by motion-compensating the reference block having the pixel values interpolated by the interpolating means for the target block.

The calculating means may calculate the filter coefficient so that a square error between the pixel values of the decoded region and a result obtained by performing filter processing on the pixel values of the reference region becomes minimum.

The decoded region may include a first decoded region and a second decoded region, which is positioned after the first decoded region in a scan order. The reference region may include a first reference region corresponding to the first decoded region and a second reference region corresponding to the second decoded region. The calculating means may calculate coefficients of filters in different directions for the first reference region and the first decoded region and for the second reference region and the second decoded region.

The scan order may be a raster scan order. The calculating means may calculate a coefficient of a horizontal-direction filter for the first reference region and the first decoded region, and may calculate a coefficient of a vertical-direction filter for the second reference region and the second decoded region.

The first decoded region and the second decoded region may have the same size.

The filter may be an AIF (Adaptive Interpolation Filter).

The image processing apparatus may further include receiving means for receiving an integer-precision motion vector between the target block and the reference block. The setting means may set the decoded region and the reference region on the basis of the motion vector received by the receiving means.

An image processing method according to the first aspect of the present invention includes: setting, as a decoded region, a region that is adjacent to a target block of a decoding target image, which is a target to be decoded, and that is decoded earlier than the target block, and setting, as the reference region, a region whose positional relationship with a reference block of a reference image is the same as a positional relationship of the decoded region; calculating a filter coefficient of a filter that converts pixel values of the set reference region into pixel values of the decoded region; interpolating pixel values of the reference block by using an adjustment filter having the calculated filter coefficient; and generating a prediction image corresponding to the decoding target image by motion-compensating the reference block having the interpolated pixel values for the target block.

In the first aspect of the present invention, a region that is adjacent to a target block of a decoding target image, which is a target to be decoded, and that is decoded earlier than the target block is set as a decoded region, and a region whose positional relationship with a reference block of a reference image is the same as a positional relationship of the decoded region is set as the reference region. A filter coefficient of a filter that converts pixel values of the set reference region into pixel values of the decoded region is calculated. Pixel values of the reference block are interpolated by using an adjustment filter having the calculated filter coefficient. A prediction image corresponding to the decoding target image is generated by motion-compensating the reference block having the interpolated pixel values for the target block.

An image processing apparatus according to a second aspect of the present invention includes: setting means for setting, as an encoded region, a region that is adjacent to a target block of an encoding target image, which is a target to be encoded, and that is encoded earlier than the target block, and for setting, as the reference region, a region whose positional relationship with a reference block of a decoded reference image, which has been encoded earlier than the encoding target image, is the same as a positional relationship of the encoded region; calculating means for calculating a filter coefficient of a filter that converts pixel values of the reference region set by the setting means into pixel values of the decoded region set by the setting means; interpolating means for interpolating pixel values of the reference block by using an adjustment filter having the filter coefficient calculated by the calculating means; and generating means for generating a prediction image corresponding to the encoding target image by motion-compensating the reference block having the pixel values interpolated by the interpolating means for the target block.

The image processing apparatus may further include motion-vector calculating means for calculating a motion vector between the target block and the reference block with an integer precision.

The filter may be an AIF (Adaptive Interpolation Filter).

An image processing method according to the second aspect of the present invention includes: setting, as an encoded region, a region that is adjacent to a target block of an encoding target image, which is a target to be encoded, and that is encoded earlier than the target block, and setting, as the reference region, a region whose positional relationship with a reference block of a decoded reference image, which has been encoded earlier than the encoding target image, is the same as a positional relationship of the encoded region; calculating a filter coefficient of a filter that converts pixel values of the set reference region into pixel values of the decoded region; interpolating pixel values of the reference block by using an adjustment filter having the calculated filter coefficient; and generating a prediction image corresponding to the encoding target image by motion-compensating the reference block having the interpolated pixel values for the target block.

In the second aspect of the present invention, a region that is adjacent to a target block of an encoding target image, which is a target to be encoded, and that is encoded earlier than the target block is set as an encoded region, and a region whose positional relationship with a reference block of a decoded reference image, which has been encoded earlier than the encoding target image, is the same as a positional relationship of the encoded region is set as the reference region. A filter coefficient of a filter that converts pixel values of the set reference region into pixel values of the decoded region is calculated. Pixel values of the reference block are calculated by using an adjustment filter having the calculated filter coefficient. A prediction image corresponding to the encoding target image is generated by motion-compensating the reference block having the interpolated pixel values for the target block.

Advantageous Effects of Invention

According to one aspect of the present invention, it is possible to suppress an increase in the amount of encoding while realizing high-performance motion compensation.

BRIEF DESCRIPTION OF DRAWINGS

FIG. 22 illustrates examples of sizes of a macroblock.

DESCRIPTION OF EMBODIMENTS

A detailed description of specific embodiments to which the present invention is applied is given below with reference to the drawings.

Figure 3:
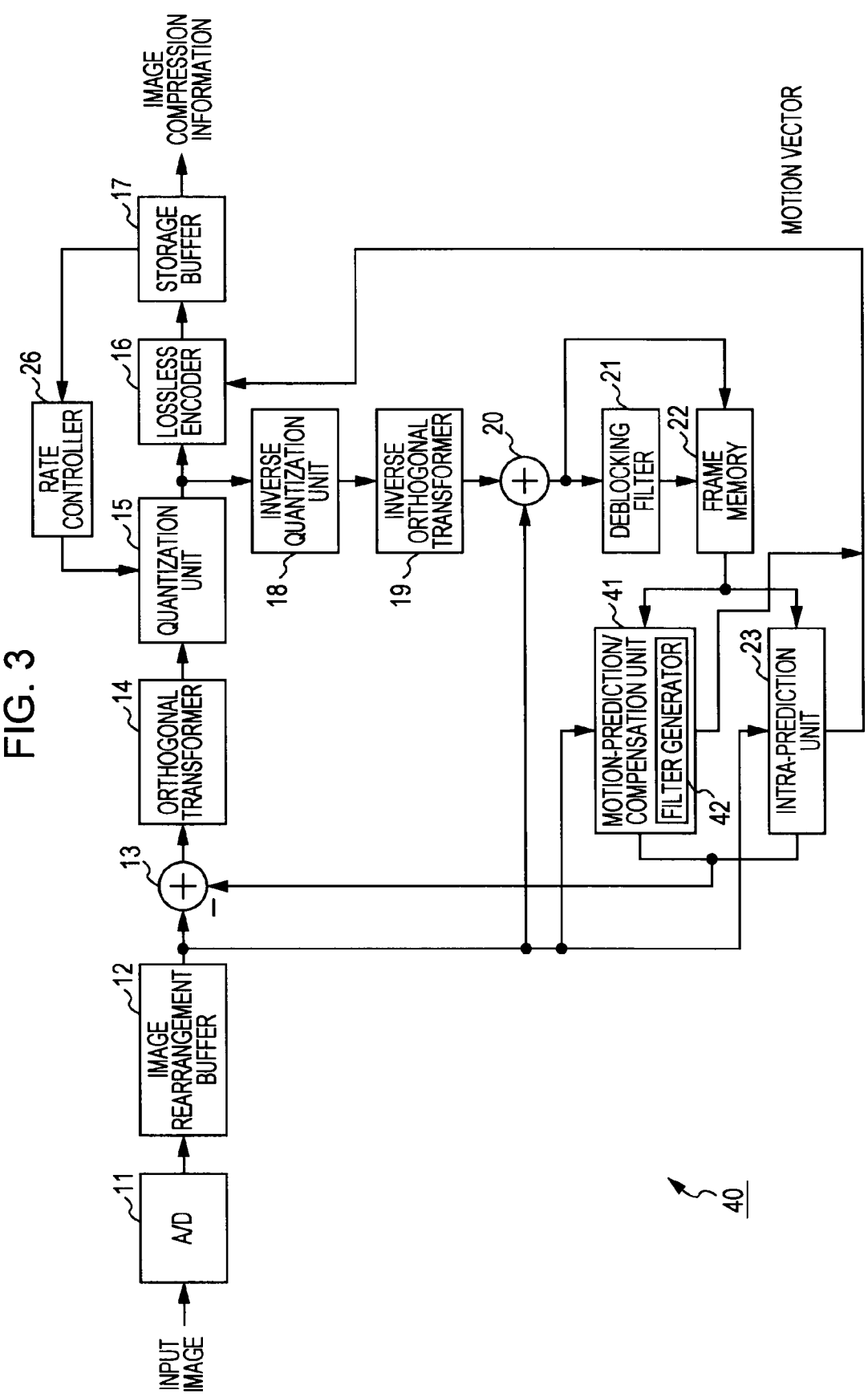
FIG. 3 is a block diagram illustrating an example of the configuration of an image encoding apparatus to which the present invention is applied.

FIG. 3 illustrates an example of the configuration of an image encoding apparatus, which is an embodiment of the present invention. This image encoding apparatus 40 performs compression-encoding on a moving image to be input (hereinafter referred to as an "input image"), and outputs image compression information obtained as a result of compression-encoding.

Figure 1:
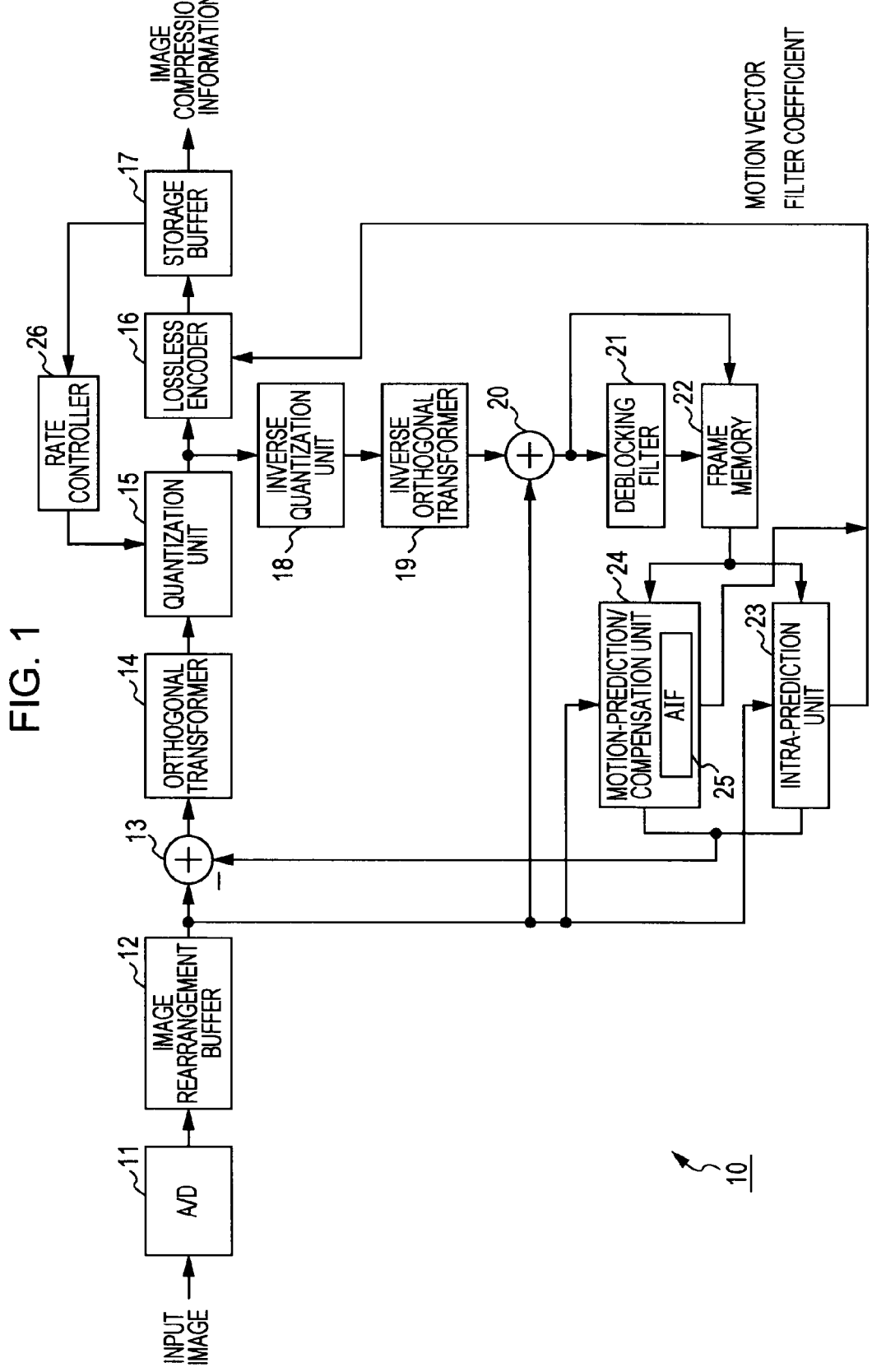
FIG. 1 is a block diagram illustrating an example of the configuration of a known image encoding apparatus.
Figure 2:
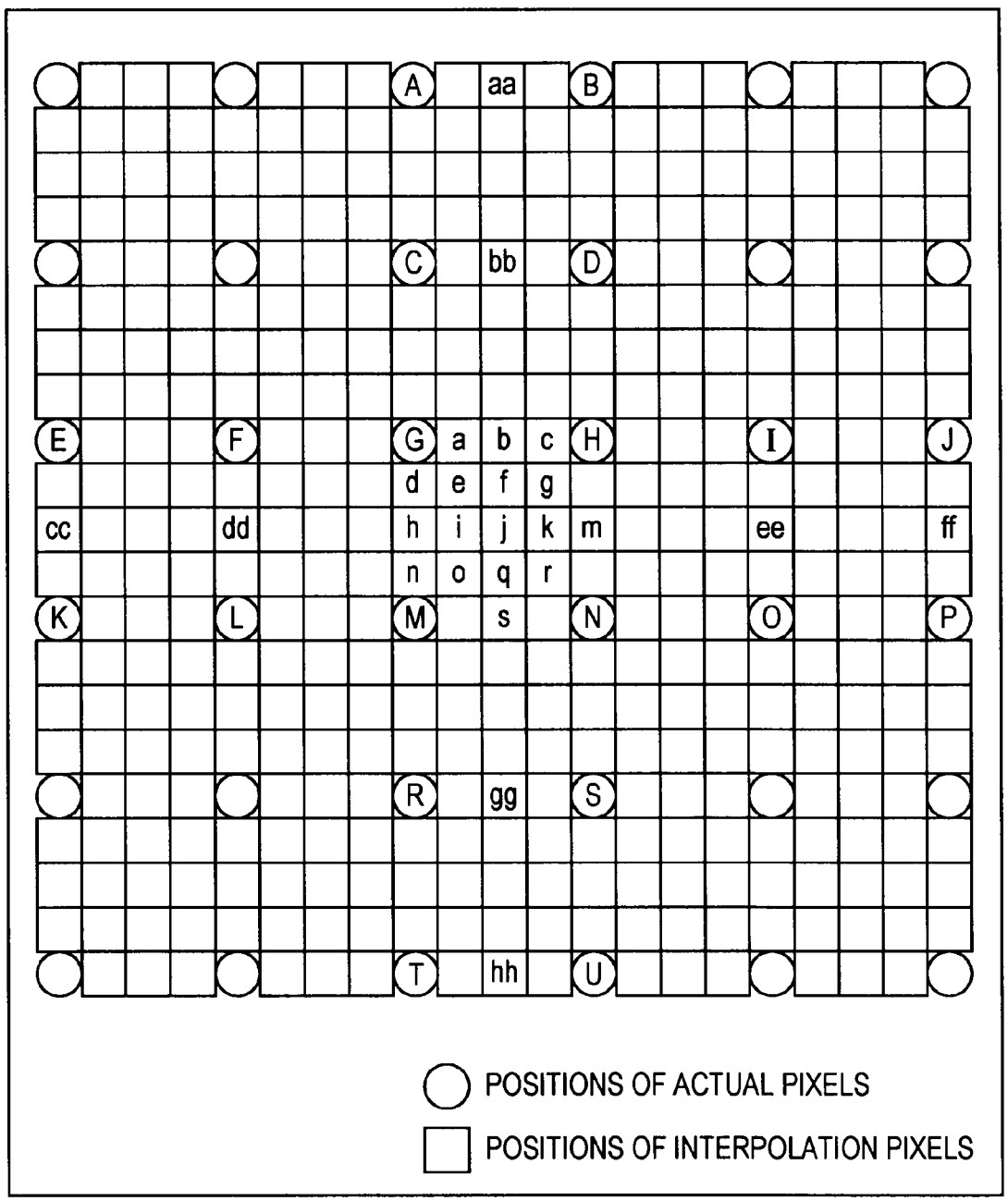
FIG. 2 illustrates interpolations of pixels.

The image encoding apparatus 40 differs from the image encoding apparatus 10 shown in FIG. 1 in that a motion-prediction/compensation unit 41 is provided instead of the motion-prediction/compensation unit 24 of the image encoding apparatus 10 shown in FIG. 1. The elements other than the motion-prediction/compensation unit 41 are the same as those of the image encoding apparatus 10, and are designated by like reference numerals. Thus, an explanation thereof is omitted if it is not necessary.

Incidentally, as described above, if the motion-prediction/compensation unit 24 contains the AIF 25 and performs motion compensation with a fraction precision, motion vectors are also represented with a fraction precision. Accordingly, the amount of information is greater than that when motion vectors are represented with an integer precision, and as a result, the amount of encoding for image compression information is increased.

The motion-prediction/compensation unit 24 of the image encoding apparatus 10 calculates motion vectors with a fraction precision. In contrast, the motion-prediction/compensation unit 41 calculates motion vectors with an integer precision. Accordingly, the amount of information indicating integer-precision motion vectors output from the motion-prediction/compensation unit 41 is smaller than that of information indicating fraction-precision motion vectors. As a result, the amount of encoding for image compression information output from the image encoding apparatus 40 is smaller than that for image compression information output from the image encoding apparatus 10.

The motion-prediction/compensation unit 41 contains a filter generator 42. In motion compensation, the filter generator 42 assigns a reference block of a reference image to an encoding target block of an encoding target image and then generates a fine adjustment filter for fine-adjusting the pixel values of the reference block vertically and horizontally.

Next, the operation of the image encoding apparatus 40 is described.

In the image encoding apparatus 40, an input image is converted into a digital signal by the A/D 11, and is input into the image rearrangement buffer 12. In the image rearrangement buffer 12, the order of pictures is rearranged in accordance with the GOP structure when the image is output, and then, the resulting image is supplied to the subsequent block.

If the image output from the image rearrangement buffer 12 is subjected to intra-coding, the pixel values of the encoding target image and the pixel values of a prediction image subjected to intra-prediction in the intra-prediction unit 23 are supplied to the adder 13, and a difference signal between these pixel values is calculated and is output to the orthogonal transformer 14.

The output from the adder 13 is subjected to orthogonal transform (discrete transform, Karhunen-Loeve transform, or the like) by the orthogonal transformer 14, and a transform coefficient obtained as a result of orthogonal transform is quantized by the quantization unit 15. The quantized transform coefficient is supplied to the lossless encoder 16 and the inverse quantization unit 18.

In the lossless encoder 16, the quantized transform coefficient is subjected to lossless encoding (variable length coding, arithmetic coding, or the like), and the result is stored in the storage buffer 17 and is then output to the subsequent block as image compression information.

Meanwhile, in the inverse quantization unit 18, the quantized transform coefficient is subjected to inverse quantization, which corresponds to the quantization performed by the quantization unit 15, and is output to the inverse orthogonal transformer 19. In the inverse orthogonal transformer 19, inverse orthogonal transform, which corresponds to the orthogonal transform performed by the orthogonal transformer 14, is performed on the transform coefficient obtained as a result of inverse quantization. The result is then output to the adder 20.

In the adder 20, the inverse orthogonal transform result and the encoding target image are added so that a decoded image, which is an image obtained by encoding the encoding target image and by decoding it, is generated. The deblocking filter 21 removes blocking distortions from the generated decoded image, and then, the resulting image is stored in the frame memory 22.

In the intra-prediction unit 23, information indicating an intra-prediction mode applied to each macroblock of the encoding target image is output to the lossless encoder 16. This information indicating the intra-prediction mode is encoded by the lossless encoder 16 as part of information described in the header of image compression information.

If the image output from the image rearrangement buffer 12 is subjected to inter-coding, the encoding target image is input into the motion-prediction/compensation unit 41. At the same time, a decoded image output from the frame memory 22 is read into the motion-prediction/compensation unit 41 as a reference image. Then, motion-prediction/compensation is performed on the encoding target image and the reference image, and a prediction image obtained as a result of motion-prediction/compensation is supplied to the adder 13. In the adder 13, the prediction image is converted into a difference signal between the encoding target image and the prediction image, and the difference signal is output to the orthogonal transformer 14. Operations performed by the blocks subsequent to the orthogonal transformer 14 are similar to those for intra-coding, and thus, an explanation thereof is omitted.

In the motion-prediction/compensation unit 41, when generating the above-described prediction image, a motion vector of each macroblock of an encoding target image is calculated with an integer precision, and also, a fine adjustment filter is generated by using the filter generator 42. The calculated integer-precision motion vectors are output to the lossless encoder 16 and are encoded as part of information described in the header of image compression information.

Figure 4:
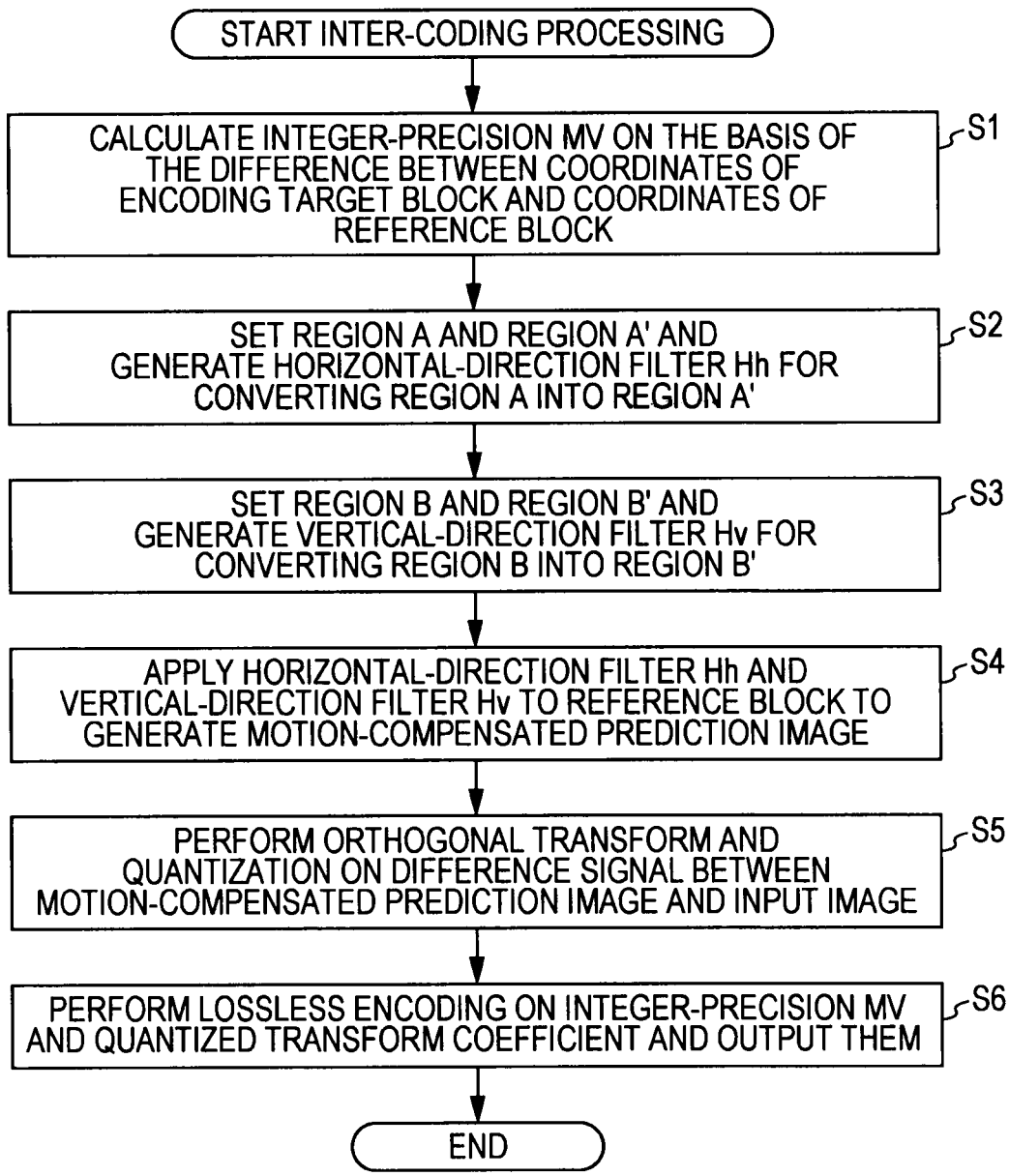
FIG. 4 is a flowchart illustrating processing when inter-coding is performed.

Next, processing executed when an encoding target image is subjected to inter-coding is described below with reference to the flowchart of FIG. 4.

As preconditions for the processing, it is assumed that an encoding target image has been input into the motion-prediction/compensation unit 41 from the image rearrangement buffer 12, and that a decoded image has been read out to the motion-prediction/compensation unit 41 from the frame memory 22 as a reference image.

Figure 5:
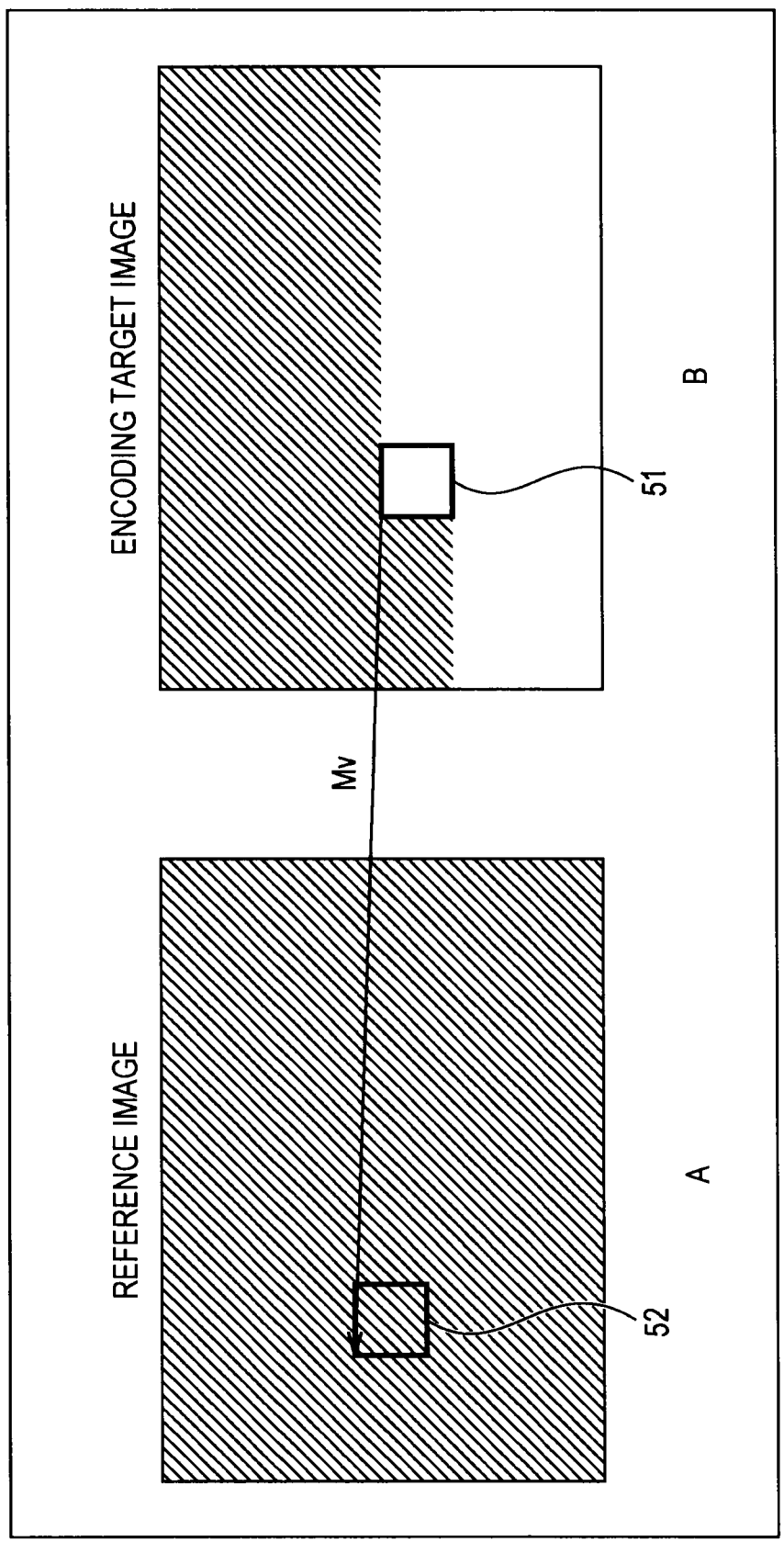
FIG. 5 illustrates inter-coding using fine adjustment filters.

In step S1, the motion-prediction/compensation unit 41 specifies, as shown in FIG. 5, the position of a reference block 52 on the reference image that is most similar to an encoding target block 51 provided on the encoding target image. The motion-prediction/compensation unit 41 then calculates a motion vector (MV) corresponding to the difference between the coordinates of the encoding target block 51 and the coordinates of the reference block 52.

In FIG. 5, the hatched portions covering the entire reference image and the hatched portions covering before the encoding target block 51 of the encoding target image indicate that they have already been encoded. The same applies to FIGS. 6 through 8. It is assumed that encoding and decoding of images are performed in the raster scan order from the left top to the right bottom.

Figure 6:
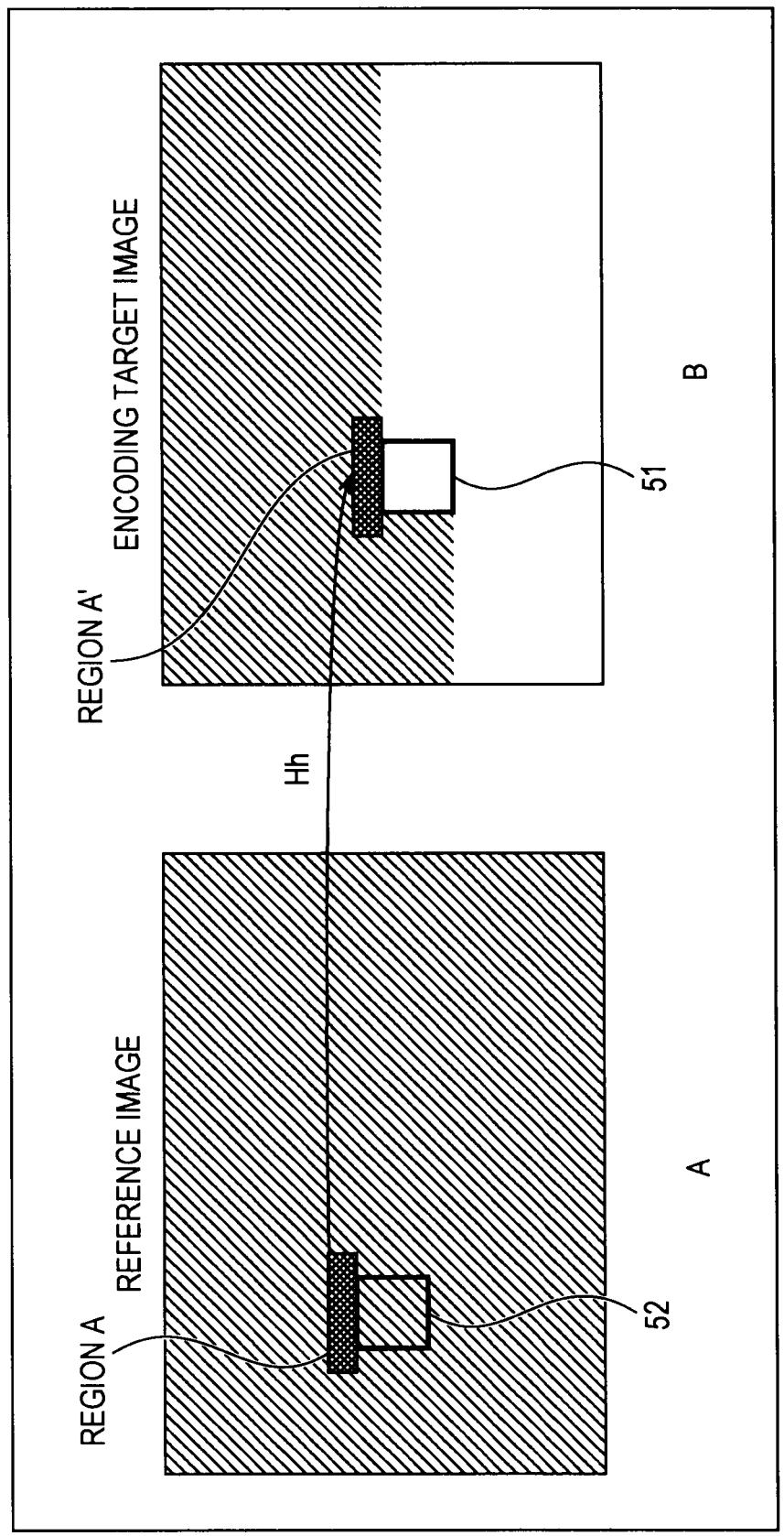
FIG. 6 illustrates inter-coding using a fine adjustment filter.

In step S2, as shown in FIG. 6, the filter generator 42 sets region A having a predetermined size positioned adjacent to the top side of the reference block 52 of the reference image, and similarly sets region A' having the same size as the region A positioned adjacent to the top side of the encoding target block 51 of the encoding target image. Here, it is characterized in that the region A and the region A' have already been decoded when decoding the encoding target block 51.

Further, in step S2, the filter generator 42 generates a horizontal-direction fine adjustment filter Hh for converting the pixel values of the region A into the pixel values of the region A'. This fine adjustment filter Hh can be realized by a FIR filter. The generation of the fine adjustment filter Hh is described later.

Figure 7:
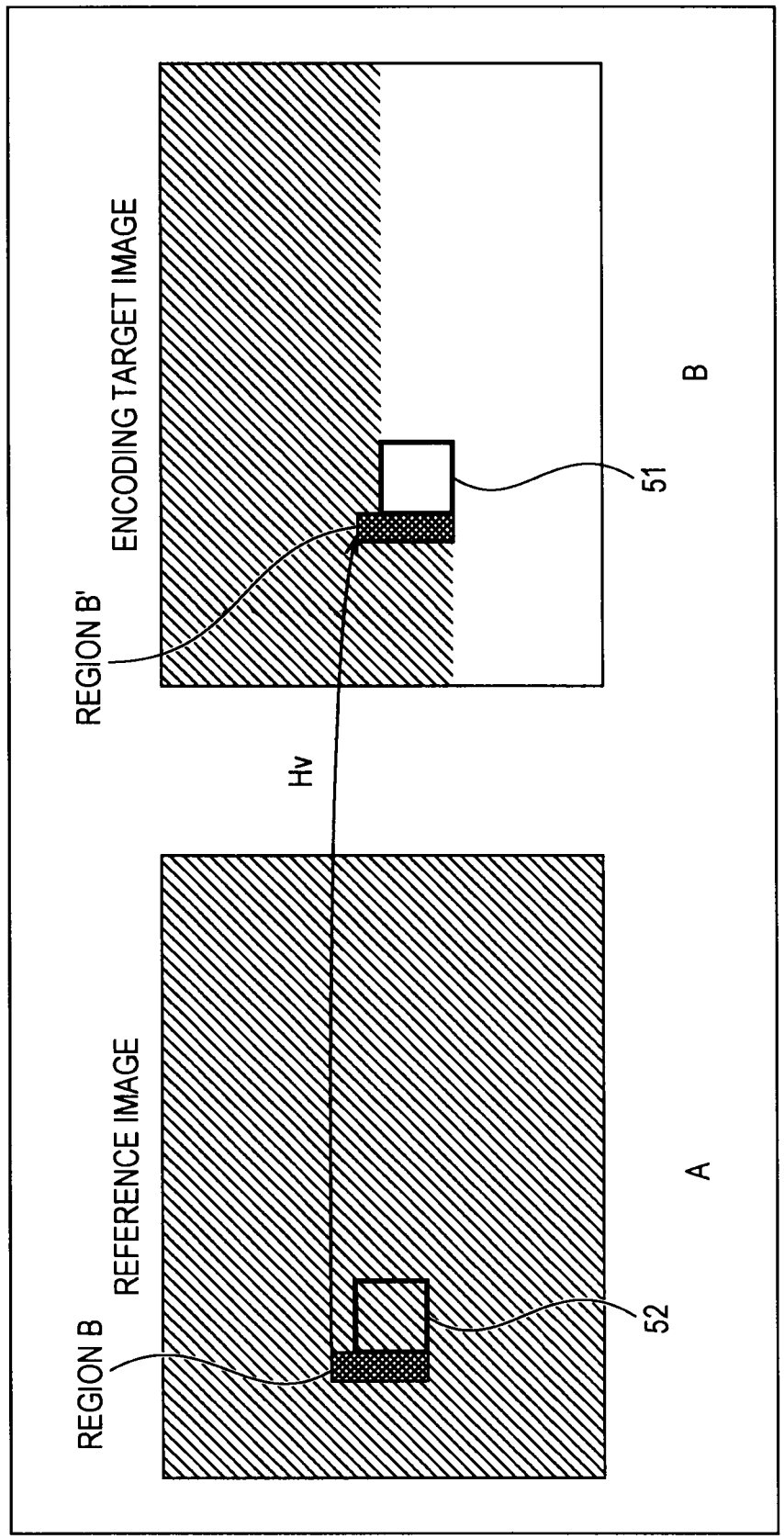
FIG. 7 illustrates inter-coding using a fine adjustment filter.

In step S3, as shown in FIG. 7, the filter generator 42 sets region B having a predetermined size positioned adjacent to the left side of the reference block 52 of the reference image, and similarly sets region B' having the same size as the region B positioned adjacent to the left side of the encoding target block 51 of the encoding target image. It is characterized in that the region B and the region B' have also already been decoded when decoding the encoding target block 51.

Further, in step S3, the filter generator 42 generates a vertical-direction fine adjustment filter Hv for converting the pixel values of the region B into the pixel values of the region B'. This fine adjustment filter Hv can also be realized by a FIR filter. The generation of the fine adjustment filter Hv is also described later.

Figure 8:
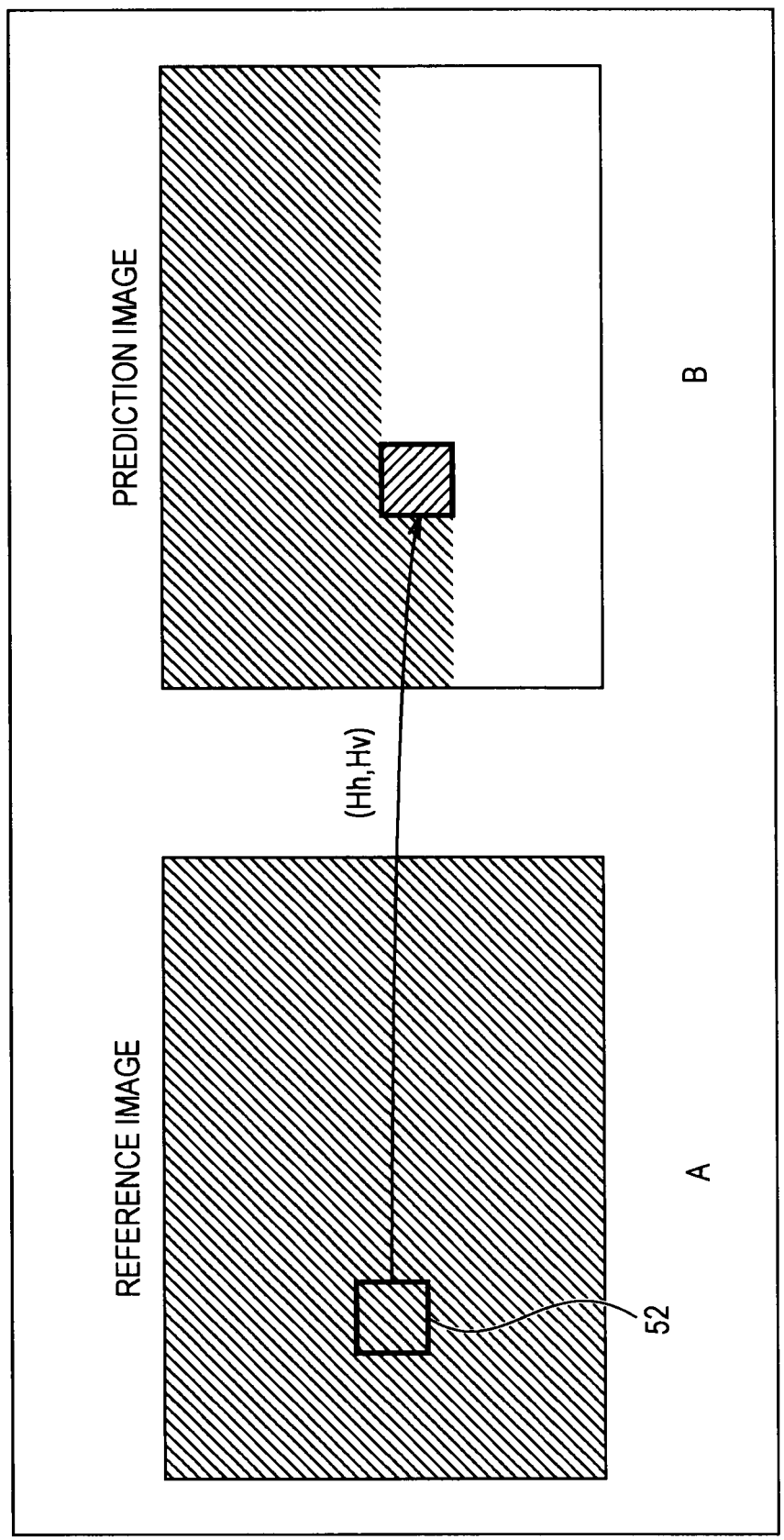
FIG. 8 illustrates inter-coding using fine adjustment filters.

In step S4, the motion-prediction/compensation unit 41 assigns, as shown in FIG. 8, the pixel values of the reference block 52 of the reference image, which are finely adjusted by using the horizontal-direction fine adjustment filter Hh and the vertical-direction fine adjustment filter Hv, to the positions of the prediction image corresponding to the encoding target block 51, thereby generating a motion-compensated prediction image little by little.

Then, the above-described steps S1 through S4 are performed sequentially on all the regions of the encoding target image set as the encoding target block 51, thereby generating a motion-compensated prediction image. The motion-compensated prediction image is output to the adder 13.

In step S5, the difference signal between the encoding target image and the prediction image is generated by the adder 13, and is subjected to orthogonal transform by the orthogonal transformer 14. The transform coefficient obtained as a result of the orthogonal transform is quantized by the quantization unit 15, and is then input into the lossless encoder 16.

Meanwhile, in step S6, the integer-precision motion vector calculated by the motion-prediction/compensation unit 41 is also input into the lossless encoder 16, and is subjected to lossless encoding together with the quantized transform coefficient. The result is stored in the storage buffer 17 and is output to the subsequent block as image compression information.

As described above, in the inter-coding processing performed by the image encoding apparatus 40, motion vectors are represented with an integer precision. Accordingly, the amount of encoding for image compression information can be decreased compared with a case where fraction-precision motion vectors are output. Additionally, since an AIF is not used, it is not necessary to output filter coefficients used in the AIF.

Further, by the application of fine adjustment filters, as in known motion compensation, good motion compensation can be performed when translation from the reference block 52 into the encoding target block 51 is conducted. Additionally, compensation can also be made to the rotation, blurring, enlargement/reduction, and a change in the luminance.

Here, the generation of the fine adjustment filters Hh and Hv is described.

The fine adjustment filters Hh and Hv are realized by, for example, a FIR filter. The FIR filter performs convolution operations expressed by the following equation (1) on an input image.

[Math. 1]

$$y(n) = \sum_{k=-N}^{+N} h(k) \times (n-k) \tag{1}$$

In equation (1), y denotes a value after processing using fine adjustment filters is performed, i.e., a pixel value of the region A' (or B'); x denotes a value before processing using the fine adjustment filters is performed, i.e., a pixel value of the region A (or B); and h is a filter coefficient. This filter coefficient is also referred to as the "impulse response", and the characteristics of the FIR filter are determined by the filter coefficient h.

In equation (1), a linear FIR filter having (2N+1) taps is used. However, the number of taps may be changed, or a two-dimensional FIR filter may be used. If a linear FIR filter is used for a two-dimensional image region, filter processing is performed in the horizontal (vertical) direction, and then, filter processing is performed in the vertical (horizontal) direction.

The filter coefficient of the FIR filter, which serves as the fine adjustment filters Hh and Hv, is determined so that the mean square error e expressed by the following equation (2) between the pixel values of the region A' (or B') and the result obtained by performing filter processing on the pixel values of the region A (or B) becomes minimum.

[Math. 2]

$$e = E\{(d(n) - y(n))^2\} = E\left\{\left(\left(d(n) - \sum_{k=-N}^{+N} h(k) \times (n-k)\right)^2\right)\right\} \quad (2)$$

In equation (2), d(n) denotes a pixel value of the region A' (or B'), y(n) denotes the result obtained by performing filter processing on a pixel value of the region A (or B), and x is a pixel value of the region A (or B). E{ } denotes an expected value within the brackets.

To determine the filter coefficient h on the basis of equation (2), the mean square error e is partially differentiated by the filter coefficient h, as expressed by equations (3).

[Math. 3]

$$\frac{\partial e}{\partial h(m)} = \frac{\partial}{\partial h(m)} E\{(d(n) - y(n))^2\} = \quad (3)$$

$$E\left\{\frac{\partial}{\partial h(m)}\left(d(n) - \sum_{k=-N}^{+N} h(k) \times (n-k)\right)^2\right\} =$$

$$-2\left[E\{d(n) \times (n-m)\} - \sum_{k=-N}^{+N} h(k)E\{x(n-k) \times (n-m)\}\right]$$

$$m = -N, \ldots, -2, -1, 0, 1, 2, \ldots, +N$$

Further, as expressed by equations (4), equations (3) are rearranged to be 0, and the filter coefficient h is calculated.

[Math. 4]

$$E\{d(n) \times (n-m)\} = \sum_{k=-N}^{+N} h_{(k)}^{OP}\{x(n-k) \times (n-m)\} \quad (4)$$

$$m = -N, \ldots, -2, -1, 0, 1, 2, +N$$

In equations (4), $h_{(x)}^{OP}$ denotes the filter coefficient that minimizes the mean square error e. Equations (4) are simultaneous equations, and the filter coefficient can be determined as the solution of these simultaneous equations.

As the fine adjustment filters, the above-described FIR filter may be used. Alternatively, any type of filter may be used as long as it can predict the regions A' and B' of the encoding target image from the regions A and B of the reference image. For example, affine transformation may be applied.

Figure 9:
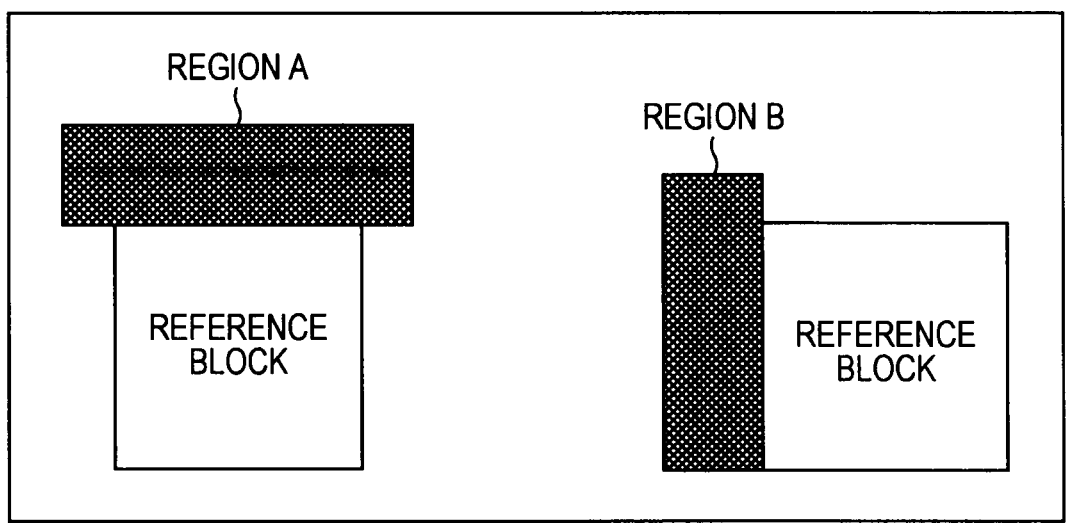
FIG. 9 illustrates an example of the shape of regions for generating a fine adjustment filter.
Figure 10:
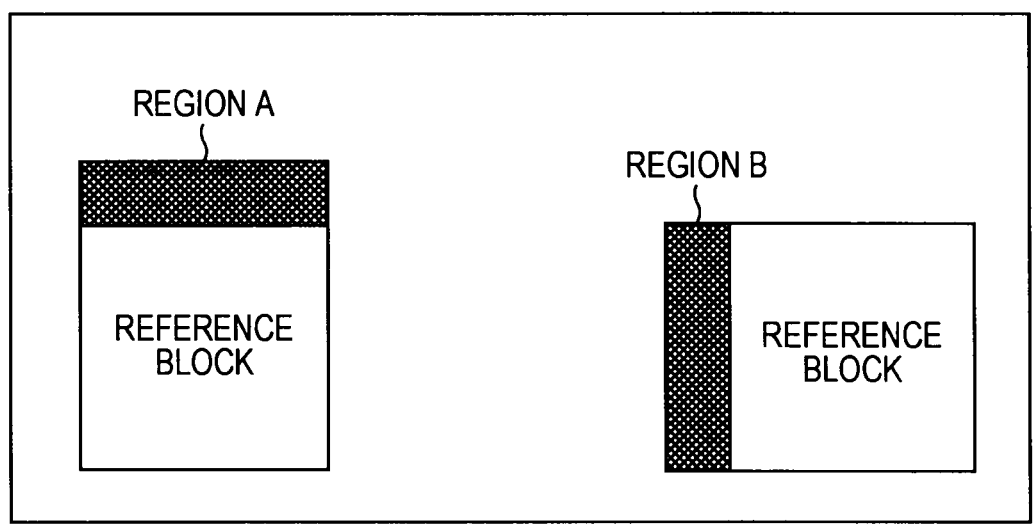
FIG. 10 illustrates an example of the shape of regions for generating a fine adjustment filter.
Figure 11:
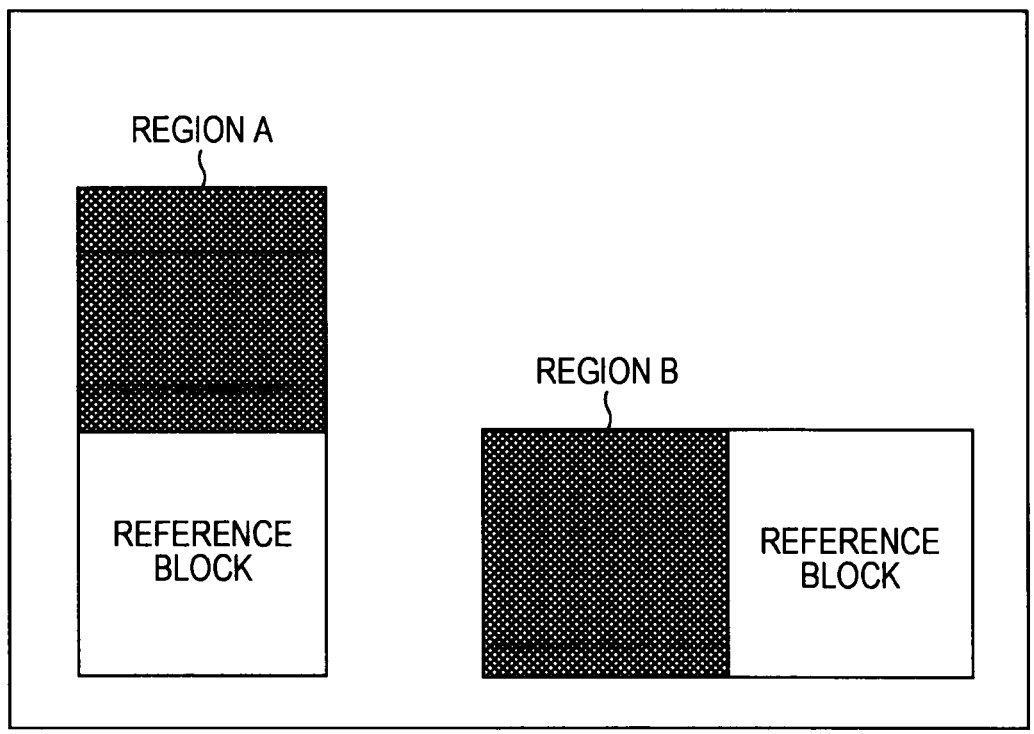
FIG. 11 illustrates an example of the shape of regions for generating fine adjustment filters.

Incidentally, the regions A and B for generating the fine adjustment filters Hh and Hv are regions that have already been decoded when the encoding target block is decoded. That is, as shown in FIG. 9, the regions A and B may be configured such that the widths of the regions A and B exceed the width of the reference block. Also, as shown in FIG. 10, the regions A and B may be configured such that the widths of the regions A and B are the same as the width of the reference block. Further, as shown in FIG. 11, the regions A and B may be the same shape as that of the reference block. However, it is necessary that the shape of the regions A and B employed in the image encoding apparatus 40 coincide with the shape of the regions A and B employed a decoding side.

Next, an image decoding apparatus that decodes image compression information output from the image encoding apparatus 40 is described below with reference to FIG. 12.

Figure 12:
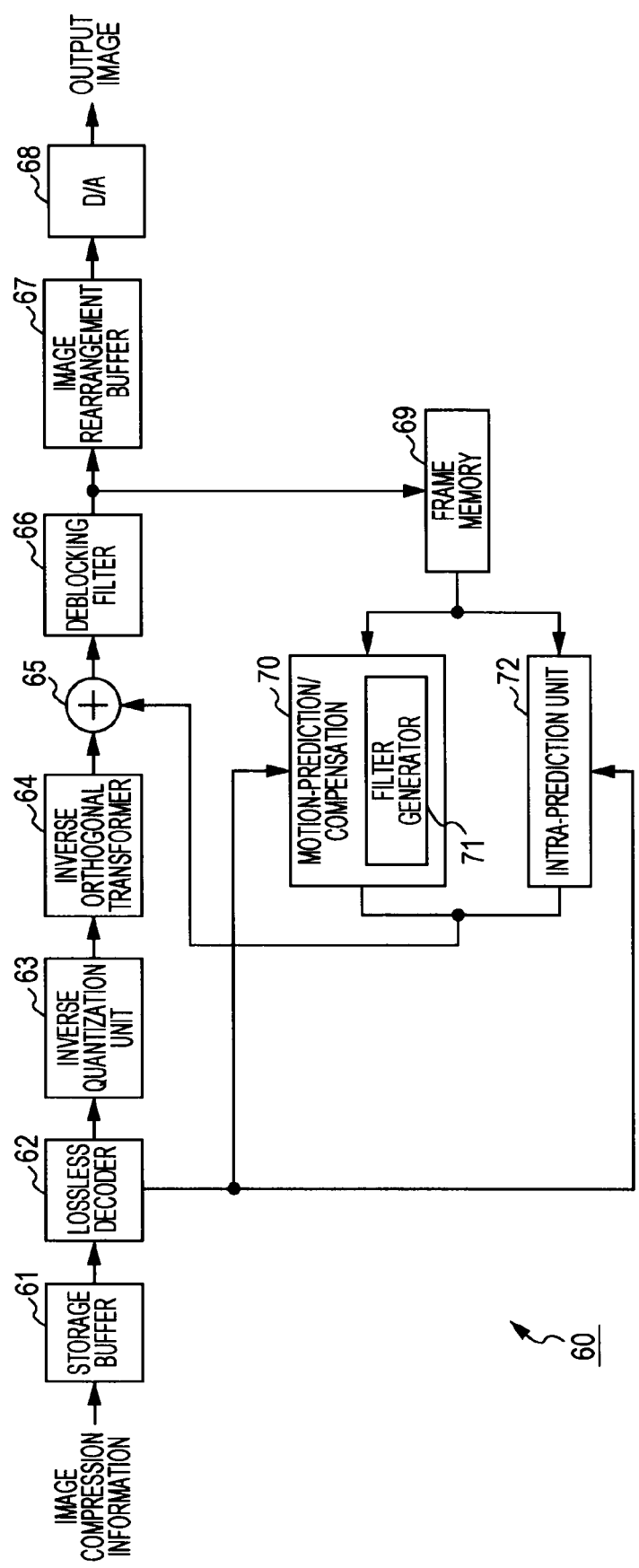
FIG. 12 is a block diagram illustrating an example of the configuration of an image decoding apparatus to which the present invention is applied.

FIG. 12 is a block diagram illustrating an example of the configuration of an image decoding apparatus to which the present invention is applied. This image decoding apparatus 60 includes a storage buffer 61, a lossless decoder 62, an inverse quantization unit 63, an inverse orthogonal transformer 64, an adder 65, a deblocking filter 66, an image rearrangement buffer 67, a digital-to-analog converter 68, a frame memory 69, a motion-prediction/compensation unit 70, and an intra-prediction unit 72.

In the image decoding apparatus 60, image compression information, which is the output from the image encoding apparatus 40, is supplied to the storage buffer 61 and is stored therein. The image compression information is sequentially output to the lossless decoder 62. In the lossless decoder 62, an encoded signal, which serves as the image compression information, is decoded, and the quantized transform coefficient obtained as a result of decoding is output to the inverse quantization unit 63. Further, if the image to be decoded is an inter-coded image, a motion vector obtained as a result of decoding is output to the motion-prediction/compensation unit 70. Also, if the image to be decoded is an intra-coded image, intra-prediction mode information obtained as a result of decoding is output to the intra-prediction unit 72.

In the inverse quantization unit 63, the quantized transform coefficient is subjected to inverse quantization, and the transform coefficient obtained as a result of inverse quantization is output to the inverse orthogonal transformer 64. In the inverse orthogonal transformer 64, the transform coefficient is subjected to inverse orthogonal transform, and the difference signal obtained as a result of inverse orthogonal transform is output to the adder 65. In the adder 65, if the image to be decoded is an inter-coded image, the difference signal output from the inverse orthogonal transformer 64 is added to the prediction image received from the motion-prediction/compensation unit 70, thereby generating a decoded image. If the image to be decoded is an intra-coded image, the difference signal output from the inverse orthogonal transformer 64 is added to the prediction signal received from the intra-prediction unit 72, thereby generating a decoded image.

The deblocking filter 66 removes blocking distortions from the decoded image. In the image rearrangement buffer 67, the decoded image from which the blocking distortions are removed is retained until the time at which it is played back. The decoded image is output to the digital-to-analog converter 68 in accordance with the playback time. In the digital-to-analog converter 68, the decoded image is converted into an analog signal and is output to the subsequent block (for example, a display).

In the frame memory 69, the decoded image from which blocking distortions are removed is stored. The decoded image retained in the frame memory 69 is read out to the motion-prediction/compensation unit 70 as a reference signal, and a prediction image is generated on the basis of the motion vector output from the lossless decoder 62 and is output to the adder 65. In the intra-prediction unit 72, a prediction image is generated on the basis of the intra-prediction mode output from the lossless decoder 62, and is output to the adder 65.

Figure 13:
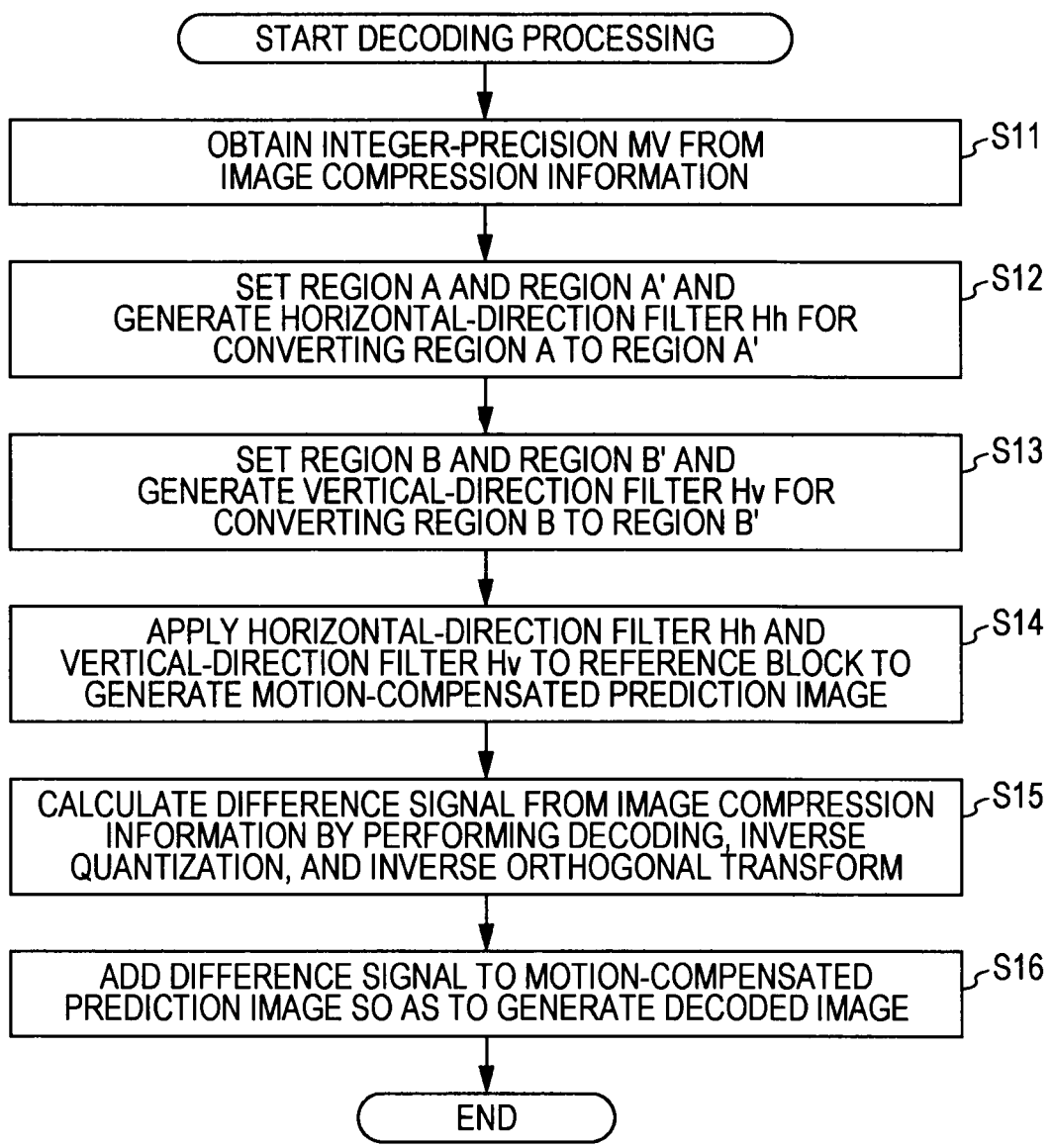
FIG. 13 is a flowchart illustrating decoding processing for an inter-coded image.

Next, decoding processing performed when an image to be decoded is an inter-coded image is described below with reference to the flowchart of FIG. 13.

As preconditions for the processing, it is assumed that a decoded image retained in the frame memory 69 is read out to the motion-prediction/compensation unit 70 as a reference image.

In step S11, the lossless decoder 62 decodes image compression information supplied from the storage buffer 61, and an integer-precision motion vector obtained as a result of decoding is output to the motion-prediction/compensation unit 70. The motion vector obtained here relatively shows, as illustrated in FIG. 14, the position of the coordinates of a reference block 92 of the reference image that should be assigned to a decoding target block 91 of a currently decoding image.

Figure 14:
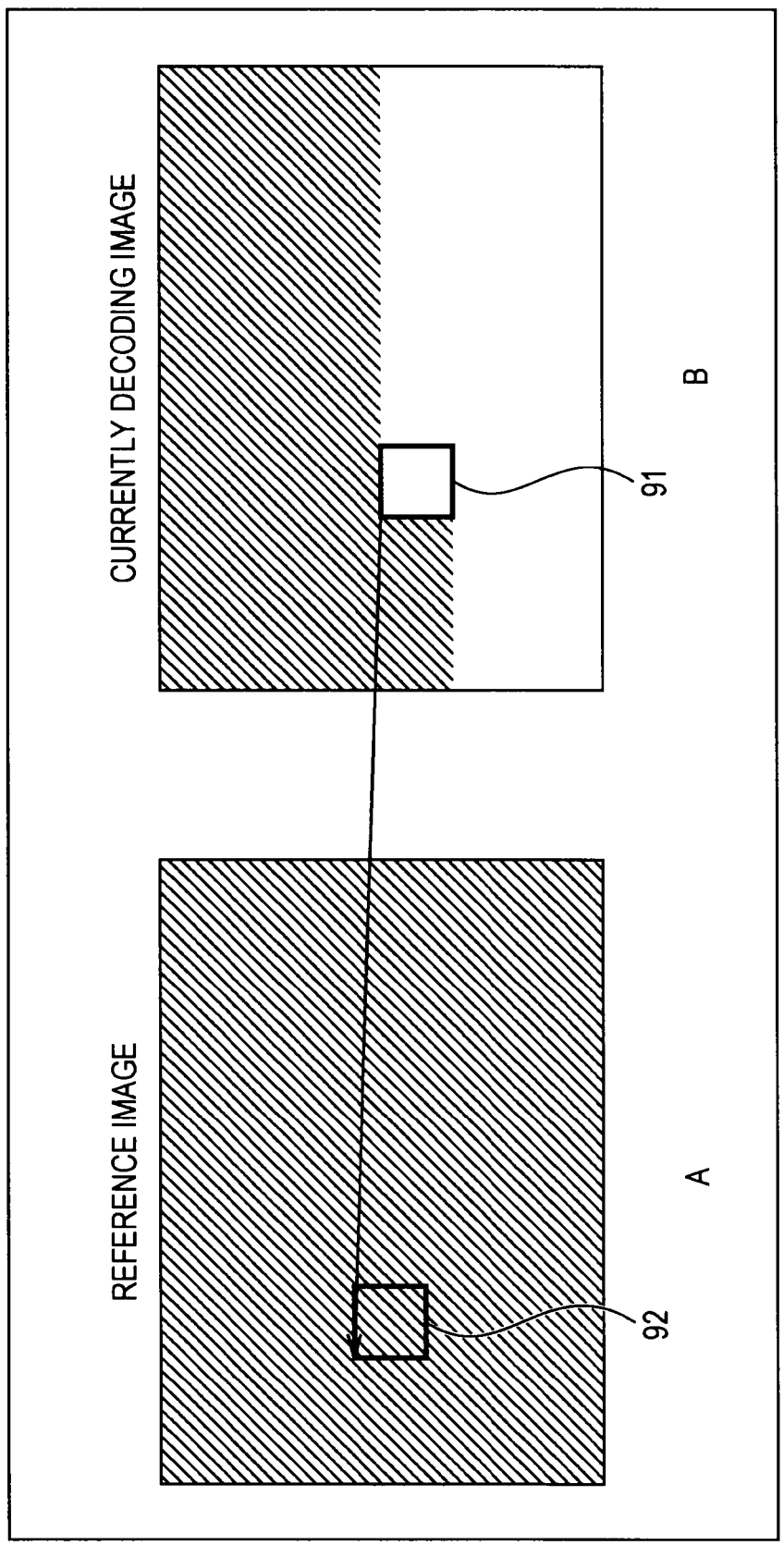
FIG. 14 illustrates decoding using fine adjustment filters.

In FIG. 14, the hatched portions covering the entire reference image and the hatched portions covering before the encoding target block 91 of the currently decoding image indicate that they have already been decoded. The same applies to FIGS. 15 through 17. It is assumed that decoding of images is performed in the raster scan order from the left top to the right bottom.

Figure 15:
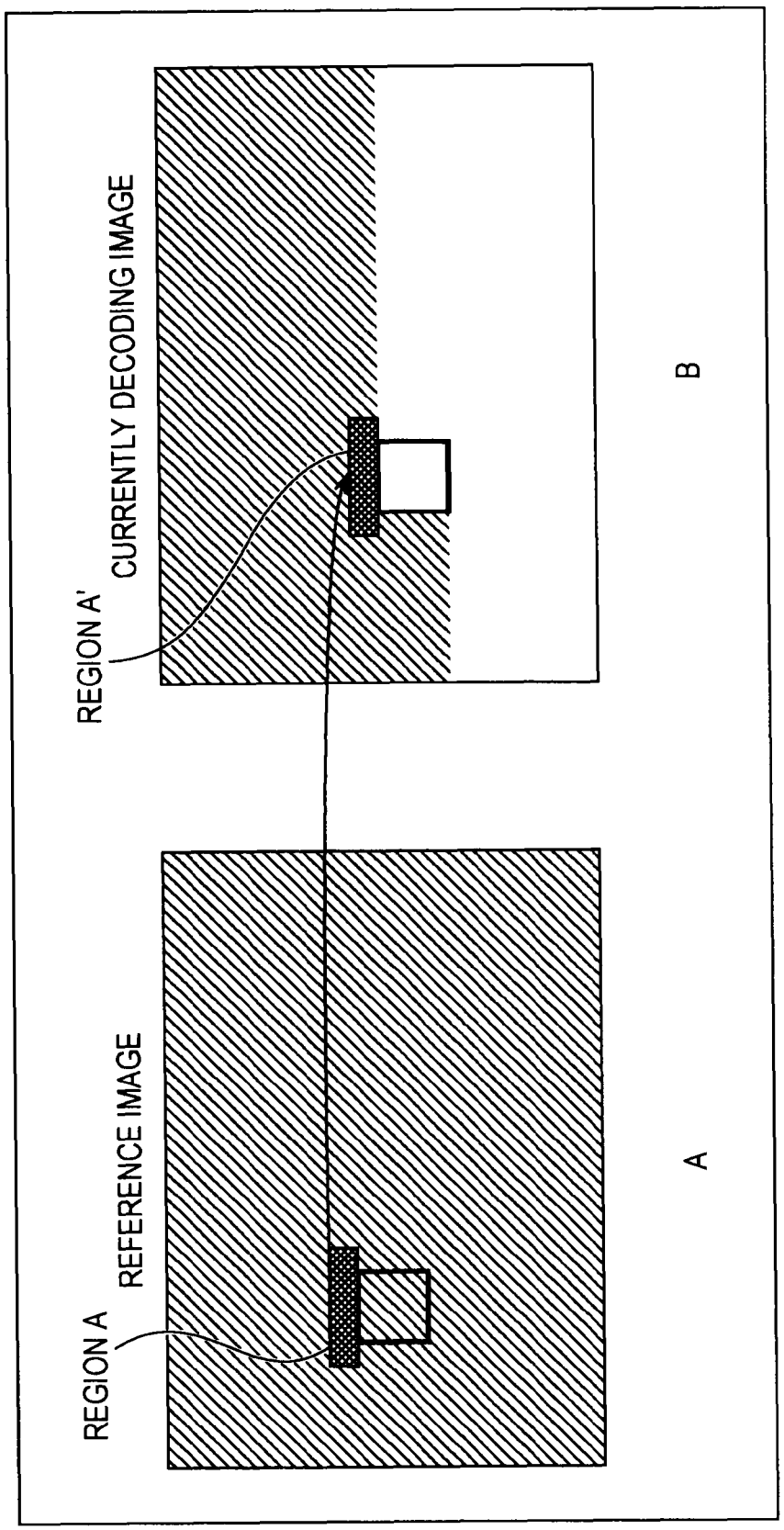
FIG. 15 illustrates decoding using a fine adjustment filter.

In step S12, as shown in FIG. 15, the filter generator 71 of the motion-prediction/compensation unit 70 sets region A having a predetermined size (the same size of the region A set when encoding is performed) adjacent to the top side of the reference block 92 of the reference image read from the frame memory 69. The filter generator 71 similarly sets region A' having the same size as the region A adjacent to the top side of the decoding target block 91 of the currently decoding image. The regions A and A' have already been decoded.

Further, in step S12, the filter generator 71 generates a horizontal-direction fine adjustment filter Hh for converting the pixel values of the region A into the pixel values of the region A'. This fine adjustment filter Hh is generated by a method similar to that when the fine adjustment filter Hh is generated during encoding.

Figure 16:
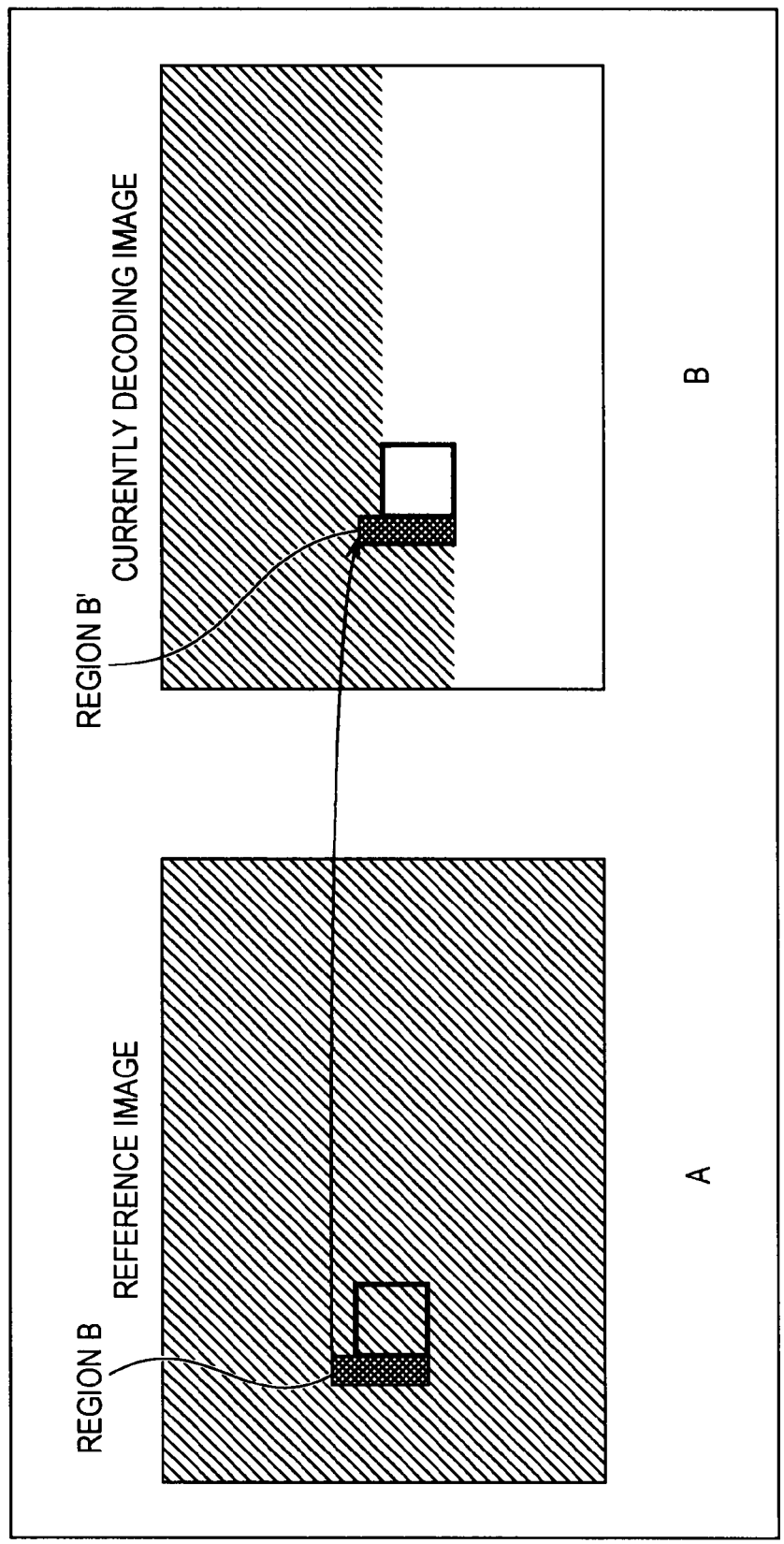
FIG. 16 illustrates decoding using a fine adjustment filter.

In step S13, as shown in FIG. 16, the filter generator 71 sets region B having a predetermined size adjacent to the left side of the reference block 92 of the reference image, and similarly sets region B' having the same size as the region B adjacent to the left side of the decoding target block 91 of the currently decoding image. The regions B and B' have already been decoded.

Further, in step S13, the filter generator 71 generates a vertical-direction fine adjustment filter Hv for converting the pixel values of the region B into the pixel values of the region B'. This fine adjustment filter Hv is also generated by a method similar to that when the fine adjustment filter Hv is generated during encoding.

Figure 17:
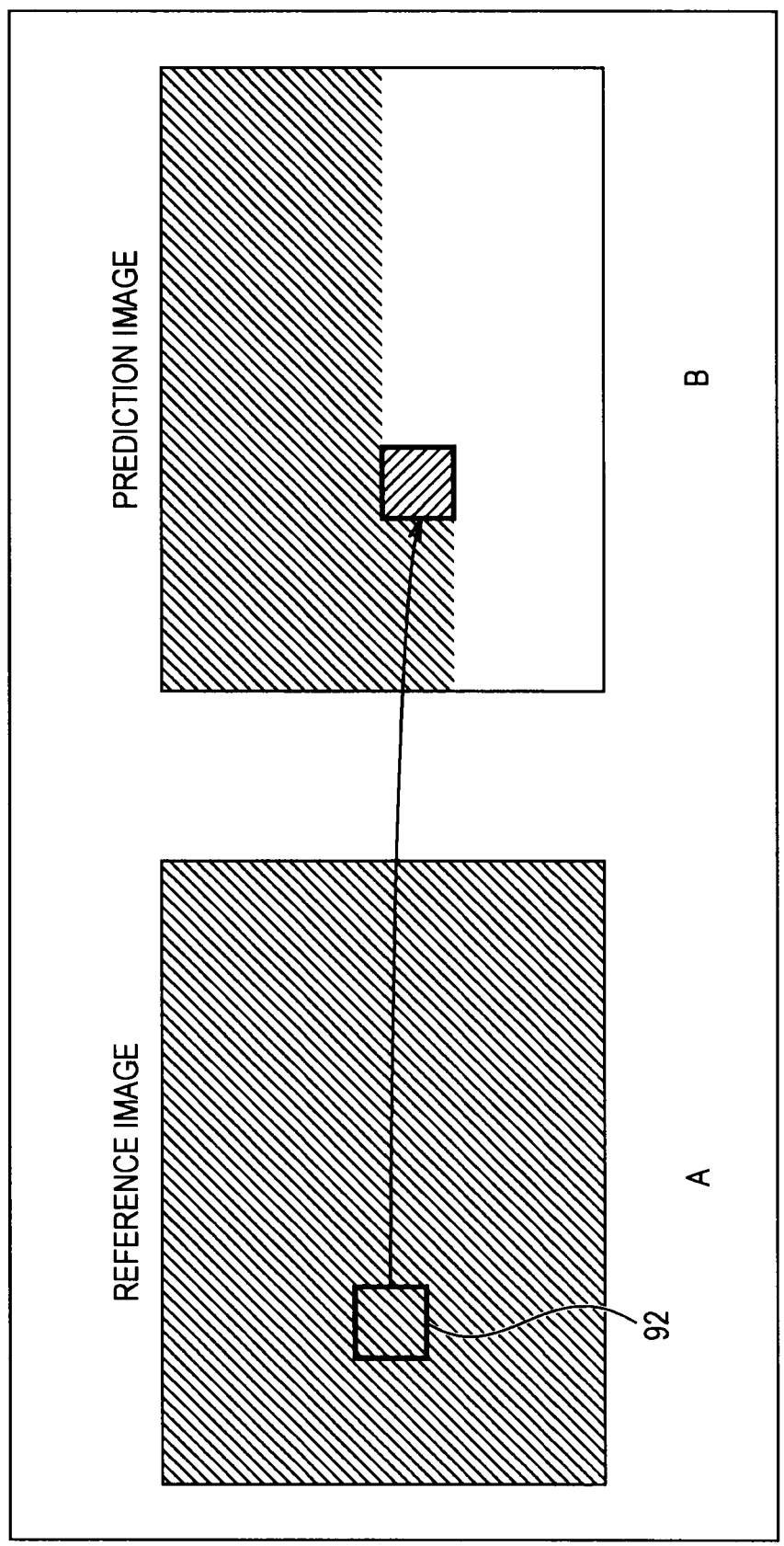
FIG. 17 illustrates decoding using fine adjustment filters.

In step S14, the motion-prediction/compensation unit 70 assigns, as shown in FIG. 17, pixel values of the reference block 92 of the reference image, which are finely adjusted by using the horizontal-direction fine adjustment filter Hh and the vertical-direction fine adjustment filter Hv, to the positions of the prediction image corresponding to the decoding target block 91, thereby generating a motion-compensated prediction image little by little.

Then, the above-described steps S11 through S14 are performed sequentially on all the regions of the currently decoding image as the decoding target block 91, thereby generating a motion-compensated prediction image. The motion-compensated prediction image is output to the adder 65.

Meanwhile, in step S15, the lossless decoder 62 outputs the quantized transform coefficient obtained by decoding the image compression information to the inverse quantization unit 63. This quantized transform coefficient is subjected to inverse quantization by the inverse quantization unit 63 and is subjected to inverse orthogonal transform by the inverse orthogonal transformer 64. A difference signal obtained as a result of inverse quantization and inverse orthogonal transform is then input into the adder 65.

In step S16, the adder 65 adds the difference signal output from the inverse orthogonal transformer 64 to the prediction image output from the motion-prediction/compensation unit 70, thereby generating a decoded image. The deblocking filter 66 removes blocking distortions from the decoded image. The decoded image is then stored in the image rearrangement buffer 67, and is output in accordance with the playback time. The decoded image from which blocking distortions are removed is also retained in the frame memory 69, and is used as a reference image when decoding a subsequent frame.

As described above, in performing decoding processing on inter-coded images, when assigning a reference block to a decoding target block, pixel values are adjusted by the use of fine adjustment filters that are generated on the basis of the regions adjacent to each block. Thus, as in known motion compensation, good motion compensation can be performed when translation of the reference block 92 into the decoding target block 91 is conducted. Additionally, compensation can also be made to the rotation, blurring, enlargement/reduction, and a change in the luminance. Thus, high-quality motion compensation can be performed.

The present invention focuses on the following point. In order to suppress an increase in the amount of encoding and the overhead accompanied by the transmission of filter coefficients generated by an encoder, the filter coefficients are predicted and generated with high precision by a decoder. In this case, by focusing on the fact that a block adjacent to a target block and a block adjacent to a reference block have high correlation, the pixel values of the block adjacent to the reference block are input, and the result obtained by performing filter processing on the pixel values of the block adjacent to the target block is output. Then, a filter coefficient is calculated so that the minimum (mean) square error between the input and the output becomes minimum. With this arrangement, high-precision filter coefficients can be calculated by a decoder while suppressing an increase in the amount of encoding accompanied by the transmission of filter coefficients.

Incidentally, the above-described image encoding apparatus 40 and image decoding apparatus 60 can be executed by hardware or software. If they are executed by software, a program forming that software is installed from a program recording medium into a computer built in dedicated hardware or a computer, for example, a general-purpose computer, that can execute various functions by installing various programs into that general-purpose computer.

The program to be executed by a computer may be a program that is executed in chronological order, as in the order described in this specification, or may be a program that is executed in parallel or a program that is executed when necessary, for example, when the program is called.

In addition, the program may be processed by a single computer, or may be executed by distributed processing by using a plurality of computers. Further, the program may be transferred to a remote computer and executed.

Embodiments of the present invention are not restricted to the above-described embodiments, and various modifications may be made without departing from the gist of the present invention.

For example, the above-described image encoding apparatus 40 or the image decoding apparatus 60 may be applied to a certain electronic apparatus. An example of such an application is described below.

Figure 18:
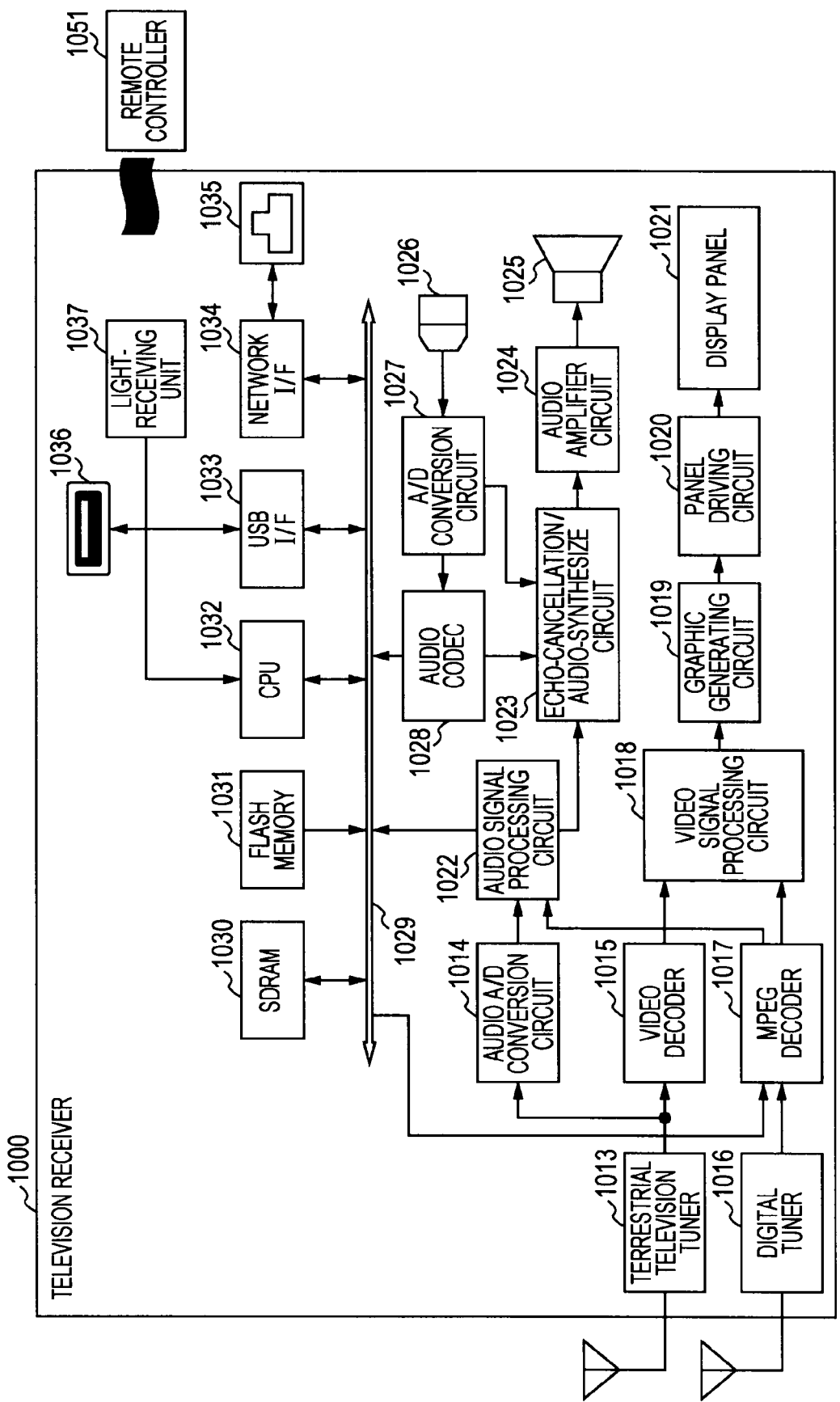
FIG. 18 is a block diagram illustrating an example of the major configuration of a television receiver to which the present invention is applied.

FIG. 18 is a block diagram illustrating an example of the configuration of a television receiver using the image decoding apparatus 60 to which the present invention is applied.

A television receiver 1000 shown in FIG. 18 includes a terrestrial television tuner 1013, a video decoder 1015, a video signal processing circuit 1018, a graphic generating circuit 1019, a panel driving circuit 1020, and a display panel 1021.

The terrestrial television tuner 1013 receives an analog terrestrial broadcasting wave signal via an antenna and demodulates the signal so as to obtain a video signal. The terrestrial television tuner 1013 supplies the video signal to the video decoder 1015. The video decoder 1015 performs decoding processing on the video signal supplied from the terrestrial television tuner 1013 so as to obtain a digital component signal. The video decoder 1015 then supplies the digital component signal to the video signal processing circuit 1018.

The video signal processing circuit 1018 performs predetermined processing, such as noise elimination, on the video data supplied from the video decoder 1015, and supplies the obtained video data to the graphic generating circuit 1019.

The graphic generating circuit 1019 generates video data of a program to be displayed on the display panel 1021 or image data by performing processing based on an application supplied via a network, and supplies the generated video data or image data to the panel driving circuit 1020. The graphic generating circuit 1019 performs processing as necessary. For example, the graphic generating circuit 1019 generates video data (graphic) for displaying screens to be used by a user for selecting items, and superposes the generated video data on program video data, and then supplies the video data obtained as a result of superposition to the panel driving circuit 1020.

The panel driving circuit 1020 drives the display panel 1021 on the basis of the data supplied from the graphic generating circuit 1019, and displays program images or the above-described various screens on the display panel 1021.

The display panel 1021 is formed of, for example, an LCD (Liquid Crystal Display), and displays program images under the control of the panel driving circuit 1020.

The television receiver 1000 also includes an audio A/D (Analog/Digital) conversion circuit 1014, an audio signal processing circuit 1022, an echo-cancellation/audio-synthesize circuit 1023, an audio amplifier circuit 1024, and a speaker 1025.

The terrestrial television tuner 1013 obtains an audio signal as well as a video signal by demodulating a received broadcasting wave signal. The terrestrial television tuner 1013 supplies the obtained audio signal to the audio A/D conversion circuit 1014.

The audio A/D conversion circuit 1014 performs A/D conversion processing on the audio signal supplied from the terrestrial television tuner 1013, and supplies an obtained digital audio signal to the audio signal processing circuit 1022.

The audio signal processing circuit 1022 performs predetermined processing, such as noise elimination, on the audio data supplied from the audio A/D conversion circuit 1014, and supplies obtained audio data to the echo-cancellation/audio-synthesize circuit 1023.

The echo-cancellation/audio-synthesize circuit 1023 supplies audio data supplied from the audio signal processing circuit 1022 to the audio amplifier circuit 1024.

The audio amplifier circuit 1024 performs D/A conversion processing and amplifying processing on the audio data supplied from the echo-cancellation/audio-synthesize circuit 1023 so as to adjust the volume of the audio data to a predetermined sound volume. The audio amplifier circuit 1024 then outputs the audio data from the speaker 1025.

The television receiver 1000 also includes a digital tuner 1016 and an MPEG decoder 1017.

The digital tuner 1016 receives a digital broadcasting (digital terrestrial broadcasting, BS (Broadcasting Satellite)/CS (Communications Satellite) digital broadcasting) signal via an antenna and demodulates the digital broadcasting signal so as to obtain MPEG-TS (Moving Picture Experts Group-Transport Stream). The digital tuner 1016 supplies the MPEG-TS to the MPEG decoder 1017.

The MPEG decoder 1017 descrambles the MPEG-TS supplied from the digital tuner 1016, and extracts streams containing program data to be played back (viewed). The MPEG decoder 1017 decodes audio packets forming the extracted streams and supplies the obtained audio data to the audio signal processing circuit 1022. The MPEG decoder 1017 also decodes video packets forming the streams and supplies the obtained video data to the video signal processing circuit 1018. In addition, the MPEG decoder 1017 supplies EPG (Electronic Program Guide) data extracted from the MPEG-TS to a CPU 1032 via a path (not shown).

The television receiver 1000 uses the above-described image decoding apparatus 60 as the MPEG decoder 1017 that decodes video packets as discussed above. The MPEG-TS transmitted from, for example, a broadcasting station, has been encoded by the image encoding apparatus 40.

As in the image decoding apparatus 60, in the MPEG decoder 1017, by focusing the fact that a block adjacent to a target block and a block adjacent to a reference block have high correlation, the pixel values of the block adjacent to the reference block are input, and the result obtained by performing filter processing on the pixel values of the block adjacent to the target block is output. Then, a filter coefficient is calculated so that the minimum (mean) square error between the input and the output becomes minimum. With this arrangement, the MPEG decoder 1017 can calculate high-precision filter coefficients while suppressing an increase in the amount of encoding accompanied by the transmission of filter coefficients in an encoder.

As in the video data supplied from the video decoder 1015, the video data supplied from the MPEG decoder 1017 is subjected to predetermined processing in the video signal processing circuit 1018, and video data, etc. generated in the graphic generating circuit 1019 is superposed on the video data supplied from the video signal processing circuit 1018 as necessary. The resulting video data is then supplied to the display panel 1021 via the panel driving circuit 1020, and the image of the video data is displayed on the display panel 1021.

As in the audio data supplied from the audio A/D conversion circuit 1014, the audio data supplied from the MPEG decoder 1017 is subjected to predetermined processing in the audio signal processing circuit 1022, and is supplied to the audio amplifier circuit 1024 via the echo-cancellation/audio-synthesize circuit 1023. In the audio amplifier circuit 1024, D/A conversion processing and amplifying processing are performed on the audio data. As a result, sound whose volume is adjusted to a predetermined volume is output from the speaker 1025.

The television receiver 1000 also includes a microphone 1026 and an A/D conversion circuit 1027.

The A/D conversion circuit 1027 receives an audio signal representing a user voice incorporated by the microphone 1026, which is used for voice conversation, provided for the television receiver 1000, and performs A/D conversion processing on the received audio signal. Then, the A/D conversion circuit 1027 supplies the obtained digital audio data to the echo-cancellation/audio-synthesize circuit 1023.

Upon receiving audio data of a user (user A) using the television receiver 1000 from the A/D conversion circuit 1027, the echo-cancellation/audio-synthesize circuit 1023 performs echo cancellation on the audio data of the user A, and synthesizes the audio data with another audio data. The echo-cancellation/audio-synthesize circuit 1023 outputs the resulting audio data to the speaker 1025 via the audio amplifier circuit 1024.

Further, the television receiver 1000 includes an audio codec 1028, an internal bus 1029, an SDRAM (Synchronous Dynamic Random Access Memory) 1030, a flash memory 1031, the CPU 1032, a USB (Universal Serial Bus) I/F 1033, and a network I/F 1034.

The A/D conversion circuit 1027 receives a signal representing a user voice incorporated by the microphone 1026, which is used for voice conversation, provided for the television receiver 1000, performs A/D conversion processing on the received audio signal, and supplies the obtained digital audio data to the audio codec 1028.

The audio codec 1028 converts the audio data supplied from the A/D conversion circuit 1027 into data having a predetermined format to be sent via a network, and supplies the data to the network I/F 1034 via the internal bus 1029.

The network I/F 1034 is connected to a network through a cable attached to a network terminal 1035. The network I/F 1034 sends the audio data supplied from the audio codec 1028 to, for example, another device that is connected to that network. Additionally, the network I/F 1034 receives via the network terminal 1035, for example, audio data sent from another device that is connected to the network I/F 1034 via a network, and supplies the received audio data to the audio codec 1028 via the internal bus 1029.

The audio codec 1028 converts the audio data supplied from the network I/F 1034 into data having a predetermined format, and supplies the audio data to the echo-cancellation/audio-synthesize circuit 1023.

The echo-cancellation/audio-synthesize circuit 1023 performs echo cancellation on the audio data supplied from the audio codec 1028, and synthesizes the audio data with another audio data. The echo-cancellation/audio-synthesize circuit 1023 then outputs the resulting audio data to the speaker 1025 via the audio amplifier circuit 1024.

The SDRAM 1030 stores various data necessary for the CPU 1032 to execute processing.

The flash memory 1031 stores programs executed by the CPU 1032. The programs stored in the flash memory 1031 are read out by the CPU 1032 at a predetermined time, for example, when the television receiver 1000 is started. In the flash memory 1031, EPG data obtained via digital broadcasting or data obtained from a predetermined server via a network are also stored.

In the flash memory 1031, for example, MPEG-TS including content data obtained from a predetermined server via a network under the control of the CPU 1032, is stored. The flash memory 1031 supplies the MPEG-TS to the MPEG decoder 1017 via the internal bus 1029, for example, under the control of the CPU 1032.

The MPEG decoder 1017 processes the MPEG-TS, in a manner similar to MPEG-TS supplied from the digital tuner 1016. In this manner, the television receiver 1000 can receive content data, such as video or audio data, via a network, and can decode the content data by using the MPEG decoder 1017 so as to display video or to output sound.

The television receiver 1000 also include a light-receiving unit 1037 that receives infrared signals transmitted from a remote controller 1051.

The light receiving unit 1037 receives infrared rays from the remote controller 1051, and outputs control code, obtained by as a result of demodulation, representing the content of a user operation to the CPU 1032.

The CPU 1032 executes a program stored in the flash memory 1031 so as to control the overall operation of the television receiver 1000 in accordance with, for example, the control code supplied from the light receiving unit 1037. The CPU 1032 and the elements of the television receiver 1000 are connected to each other via a path (not shown).

The USB I/F 1033 sends and receives data to and from external devices connected to the television receiver 1000 through a USB cable attached to a USB terminal 1036. The network I/F 1034 is connected to a network through a cable attached to the network terminal 1035 so as to send and receive data other than audio data to and from various devices connected to the network.

The television receiver 1000 can calculate high-precision filter coefficients by the use of the image decoding apparatus 60 as the MPEG decoder 1017. As a result, it is possible to suppress an increase in the amount of encoding and the overhead accompanied by the transmission of filter coefficients generated by an encoder.

Figure 19:
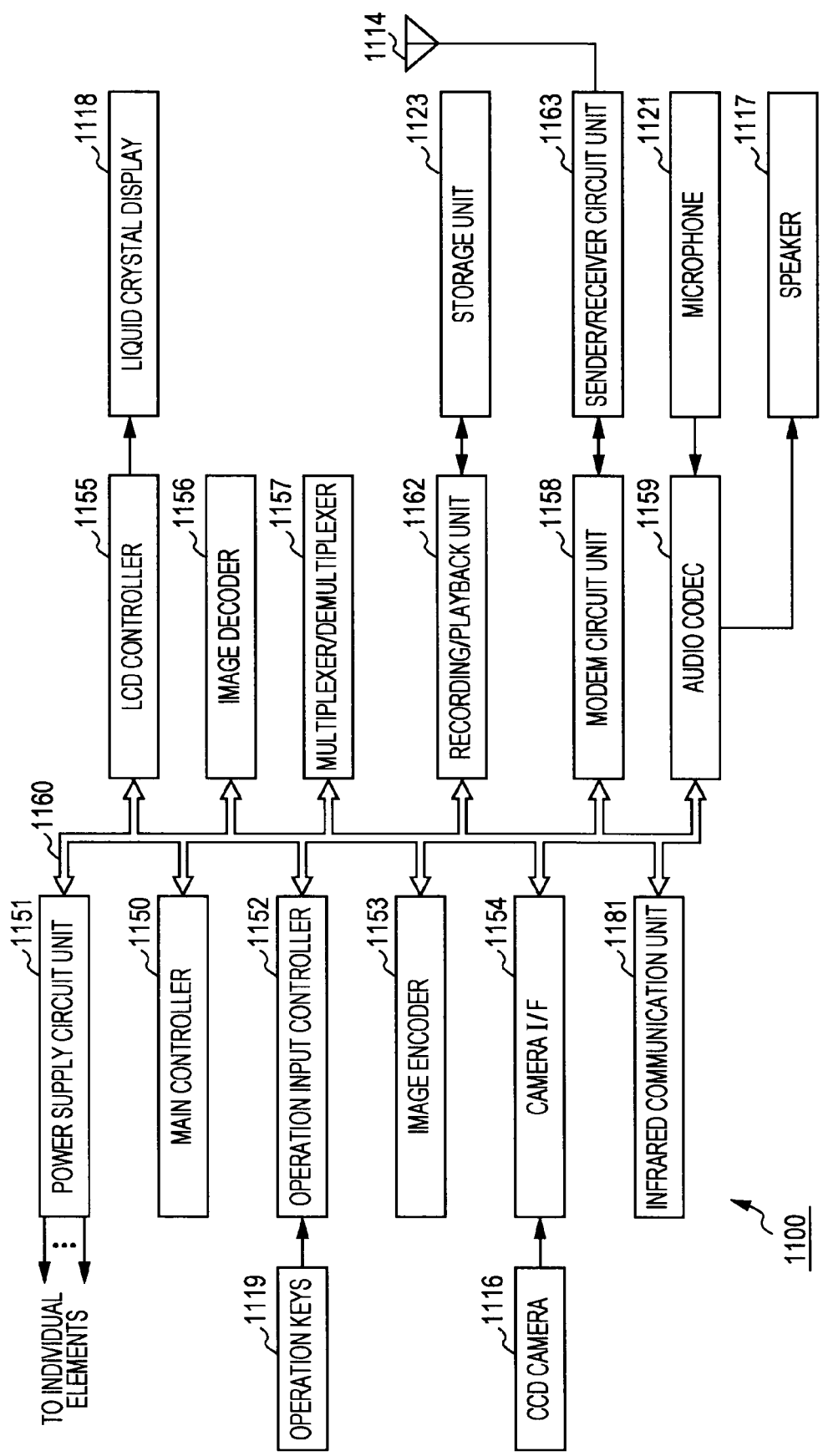
FIG. 19 is a block diagram illustrating an example of the major configuration of a cellular telephone to which the present invention is applied.

FIG. 19 is a block diagram illustrating an example of the major configuration of a cellular telephone using the image encoding apparatus and the image decoding apparatus to which the present invention is applied.

A cellular telephone 1100 shown in FIG. 19 includes a main controller 1150 that controls individual elements, a power supply circuit unit 1151, an operation input controller 1152, an image encoder 1153, a camera I/F 1154, an LCD controller 1155, an image decoder 1156, a multiplexer/demultiplexer 1157, a recording/playback unit 1162, a modem circuit unit 1158, and an audio codec 1159. These elements are connected to each other via a bus 1160.

The cellular telephone 1100 also includes operation keys 1119, a CCD (Charge Coupled Devices) camera 1116, a liquid crystal display 1118, a storage unit 1123, a sender/receiver circuit unit 1163, an antenna 1114, a microphone 1121, and a speaker 1117.

When the conversation is over or the power key is turned ON by a user operation, the power supply circuit unit 1151 supplies power to the individual elements from a battery pack, thereby rendering the cellular telephone 1100 operable.

The cellular telephone 1100 performs various operations, such as sending and receiving of audio signals, sending and receiving of e-mail or image data, image-capturing, and data recording, in various modes, such as a voice conversation mode and a data communication mode, under the control of the main controller 1150, which is formed of a CPU, a ROM, a RAM, etc.

For example, in the voice conversation mode, the cellular telephone 1100 converts an audio signal of voice collected by the microphone 1121 into digital audio data by using the audio codec 1159. The cellular telephone 1100 performs spread spectrum processing on the digital audio signal by using the modem circuit unit 1158, and performs digital-to-analog conversion processing and frequency conversion processing on the digital audio signal by using the sender/receiver circuit unit 1163. The cellular telephone 1100 transmits a sending signal obtained by the above-described conversion processing to a base station, which is not shown, via the antenna 1114. The sending signal (audio signal) transmitted to the base station is supplied to a cellular telephone of the other communication party via a public switched telephone network.

Also, for example, in the voice conversation mode, the cellular telephone 1100 amplifies a received signal received by the antenna 1114 and further performs frequency conversion processing and analog-to-digital conversion processing on the received signal by using the sender/receiver circuit unit 1163. The cellular telephone 1100 performs inverse spread spectrum processing by using the modem circuit unit 1158, and converts the received signal into an analog audio signal by using the audio codec 1159. The cellular telephone 1100 outputs the analog audio signal obtained as a result of the above-described conversion from the speaker 1117.

Further, for example, when sending e-mail in the data communication mode, the cellular telephone 1100 receives by the operation input controller 1152 e-mail text data input through the operation of the operation keys 1119. The cellular telephone 1100 processes the text data by using the main controller 1150, and displays the text data on the liquid crystal display 1118 as an image via the LCD controller 1155.

The cellular telephone 1100 also generates e-mail data by using the main controller 1150 on the basis of text data or a user instruction received by the operation input controller 1152. The cellular telephone 1100 performs spread spectrum processing on the e-mail data by using the modem circuit unit 1158, and performs digital-to-analog conversion processing and frequency conversion processing by using the sender/receiver circuit unit 1163. The cellular telephone 1100 transmits the sending signal obtained by the above-described conversion processing to a base station, which is not shown, via the antenna 1114. The sending signal (e-mail) transmitted to the base station is supplied to a predetermined address via a network, a mail server, etc.

Also, for example, when receiving e-mail in the data communication mode, the cellular telephone 1100 receives a signal transmitted from the base station by using the sender/receiver circuit unit 1163 via the antenna 1114, amplifies the signal, and performs frequency conversion processing and analog-to-digital conversion processing on the signal by using the sender/receiver circuit unit 1163. The cellular telephone 1100 performs inverse spread spectrum processing on the received signal by using the modem circuit unit 1158 so as to reconstruct the original e-mail data. The cellular telephone 1100 displays the reconstructed e-mail data on the liquid crystal display 1118 via the LCD controller 1155.

The cellular telephone 1100 may record (store) the received e-mail data in the storage unit 1123 via the recording/playback unit 1162.

This storage unit 1123 is a certain rewritable storage medium. The storage unit 1123 may be a semiconductor memory, such as a RAM or a built-in flash memory, a hard disk, a magnetic disk, a magneto-optical disk, an optical disc, a USB memory, or a removable medium, such as a memory card. Of course, the storage unit 1123 may be a storage medium other than those described above.

Further, for example, when sending image data in the data communication mode, the cellular telephone 1100 generates image data by performing image-capturing using the CCD camera 1116. The CCD camera 1116 has optical devices, such as a lens and a diaphragm, and a CCD, which serves as a photoelectric conversion device. The CCD camera 1116 captures an image of a subject and converts the intensity of the received light into an electric signal so as to generate image data of the subject image. The CCD camera 1116 encodes the image data by using the image encoder 1153 via the camera I/F 1154 so as to convert the image data into encoded image data.

The cellular telephone 1100 uses the above-described image encoding apparatus 40 as the image encoder 1153 that performs the above-described processing. As in the case of the image encoding apparatus 40, in the image encoder 1053, by focusing the fact that a block adjacent to a target block and a block adjacent to a reference block have high correlation, the pixel values of the block adjacent to the reference block are input, and the result obtained by performing filter processing on the pixel values of the block adjacent to the target block is output. Then, a filter coefficient is calculated so that the minimum (mean) square error between the input and the output becomes minimum. With this arrangement, the image encoder 1053 enables a decoder to calculate high-precision filter coefficients while suppressing an increase in the amount of encoding accompanied by the transmission of filter coefficients.

The cellular telephone 1100 performs analog-to-digital conversion by using the audio codec 1159 on sound collected by the microphone 1121 while capturing an image by using the CCD camera 1116, and further encodes the sound.

The cellular telephone 1100 combines the encoded image data supplied from the image encoder 1153 with the digital audio data supplied from the audio codec 1159 by using the multiplexer/demultiplexer 1157 according to a predetermined method. The cellular telephone 1100 performs spread spectrum processing on the resulting multiplexed data by using the modem circuit unit 1158, and performs digital-to-analog conversion processing and frequency conversion processing on the multiplexed data by using the sender/receiver circuit unit 1163. The cellular telephone 1100 transmits the sending signal obtained as a result of the above-described conversion processing to a base station, which is not shown, via the antenna 1114. The sending signal (image data) transmitted to the base station is supplied to the other communication party via, for example, a network.

If image data is not sent, the cellular telephone 1100 may display the image data generated by the CCD camera 1116 on the liquid crystal display 1118 via the LCD controller 1155 without using the image encoder 1153.

Also, for example, in the data communication mode, when receiving data of a moving image file linked to a simple homepage, etc., the cellular telephone 1100 receives a signal transmitted from a base station by using the sender/receiver circuit unit 1163 via the antenna 1114, amplifies the received signal, and performs frequency conversion processing and analog-to-digital conversion processing by using the sender/receiver circuit unit 1163. The cellular telephone 1100 performs inverse spread spectrum on the received signal by using the modem circuit unit 1158 so as to reconstruct the original multiplexed data. The cellular telephone 1100 separates the multiplexed data by using the multiplexer/demultiplexer 1157 into encoded image data and audio data.

The cellular telephone 1100 decodes the encoded image data by using the image decoder 1156 so as to generate playback moving image data, and displays the playback moving image data on the liquid crystal display 1118 via the LCD controller 1155. With this operation, moving image data contained in the moving image file linked to a simple homepage, etc. is displayed on the liquid crystal display 1118.

The cellular telephone 1100 uses the above-described image decoding apparatus 60 as the image decoder 1156 that performs the above-described processing. That is, as in the case of the image decoding apparatus 60, in the image decoder 1156, by focusing the fact that a block adjacent to a target block and a block adjacent to a reference block have high correlation, the pixel values of the block adjacent to the reference block are input, and the result obtained by performing filter processing on the pixel values of the block adjacent to the target block is output. Then, a filter coefficient is calculated so that the minimum (mean) square error between the input and the output becomes minimum. With this arrangement, the image decoder 1156 can calculate high-precision filter coefficients while suppressing an increase in the amount of encoding accompanied by the transmission of filter coefficients in an encoder.

At the same time, the cellular telephone 1100 converts digital audio data into an analog audio signal by using the audio codec 1159, and outputs the analog audio signal from the speaker 1117. With this operation, audio data contained in a moving image file linked to a simple homepage, etc. is played back.

As in the case of e-mail, the cellular telephone 1100 may record (store) the received data linked to a simple homepage, etc. on the storage unit 1123 via the recording/playback unit 1162.

Also, the cellular telephone 1100 may analyze two-dimensional code obtained as a result of image-capturing of the CCD camera 1116 by using the main controller 1150 so as to obtain information recorded on the two-dimensional code.

Further, the cellular telephone 1100 may communicate with external devices through infrared by using an infrared communication unit 1181.

The cellular telephone 1100 uses the image encoding apparatus 40 as the image encoder 1153, thereby making it possible to suppress an increase in the amount of encoding accompanied by the transmission of filter coefficients. As a result, the cellular telephone 1100 can suppress an increase in the amount of encoding and the overhead accompanied by the transmission of filter coefficients when, for example, encoding and transmitting image data generated by the CCD camera 1116.

Also, the cellular telephone 1100 uses the image decoding apparatus 60 as the image decoder 1156, thereby making it possible to predict and generate filter coefficients with high precision. As a result, the cellular telephone 1100 can suppress an increase in the amount of encoding and the overhead accompanied by the transmission of filter coefficients when, for example, receiving data (encoded data) of a moving image file linked to a simple homepage, etc.

In the foregoing description, the cellular telephone 1100 uses the CCD camera 1116. However, instead of this CCD camera 1116, an image sensor using CMOS (Complementary Metal Oxide Semiconductor) (CMOS image sensor) may be used. In this case, too, the cellular telephone 1100 can capture an image of a subject so as to generate image data of the subject image, as in the case of the CCD camera 1116.

In the foregoing description, the cellular telephone 1100 has been described as an example using the present invention. However, as in the case of the cellular telephone 1100, the image encoding apparatus 40 or the image decoding apparatus 60 may be applied to any apparatus having an image capturing function and a communication function similar to those of the cellular telephone 1100, such as a PDA (Personal Digital Assistants), a smartphone, a UMPC (Ultra Mobile Personal Computer), a netbook, or a notebook personal computer.

Figure 20:
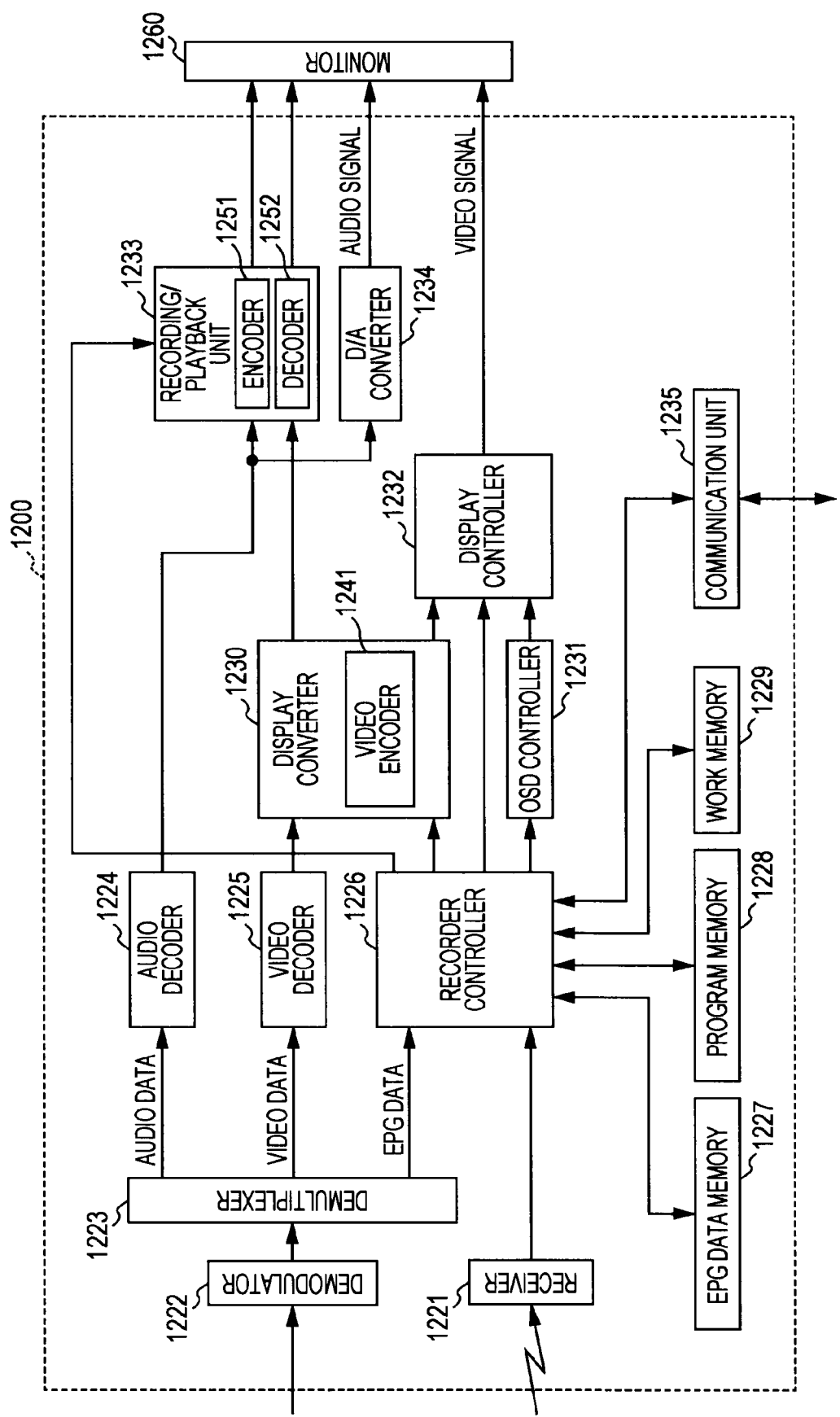
FIG. 20 is a block diagram illustrating an example of the major configuration of a hard disk recorder to which the present invention is applied.

FIG. 20 is a block diagram illustrating an example of the major configuration of a hard disk recorder using an image encoding apparatus and an image decoding apparatus to which the present invention is applied.

A hard disk recorder (HDD recorder) 1200 shown in FIG. 20 is an apparatus that stores, in a built-in hard disk, audio data and video data of a broadcast program contained in a broadcasting signal (television signal) transmitted by a satellite or terrestrial antenna, etc., and received by a tuner, and that provides the stored data to a user at a time according to an instruction from the user.

The hard disk recorder 1200 can extract, for example, audio data and video data, from a broadcasting signal so as to decode the audio data and the video data when necessary, and stores the audio data and the video data in the built-in hard disk. The hard disk recorder 1200 can also obtain audio data and video data from another device via, for example, a network, so as to decode the audio data and the video data when necessary, and stores the audio data and the video data in the built-in hard disk.

Further, the hard disk recorder 1200 can decode audio data and video data recorded in, for example, the built-in hard disk, and supplies the audio data and the video data to a monitor 1260. The hard disk recorder 1200 displays the image of the video data on the screen of the monitor 1260, and outputs the sound of the audio data from the speaker of the monitor 1260. Also, the hard disk recorder 1200 can decode audio data and video data extracted from a broadcasting signal obtained via a tuner, or decodes audio data and video data obtained from another device via a network, and supplies the audio data and the video data to the monitor 1260. The hard disk recorder 1200 displays the image of the video data on the screen of the monitor 1260 and outputs the sound of the audio data from the speaker of the monitor 1260.

Of course, operations other than the above-described operations can be performed.

The hard disk recorder 1200 includes, as shown in FIG. 20, a receiver 1221, a demodulator 1222, a demultiplexer 1223, an audio decoder 1224, a video decoder 1225, and a recorder controller 1226. The hard disk recorder 1200 also includes an EPG data memory 1227, a program memory 1228, a work memory 1229, a display converter 1230, an OSD (On Screen Display) controller 1231, a display controller 1232, a recording/playback unit 1233, a D/A converter 1234, and a communication unit 1235.

Also, the display converter 1230 includes a video encoder 1241. The recording/playback unit 1233 includes an encoder 1251 and a decoder 1252.

The receiver 1221 receives an infrared signal from a remote controller (not shown) and converts the infrared signal into an electric signal so as to output the electric signal to the recorder controller 1226. The recorder controller 1226 is formed of, for example, a microprocessor, and executes various operations in accordance with a program stored in the program memory 1228. In this case, the recorder controller 1229 uses the work memory 1229 if necessary.

The communication unit 1235 is connected to a network so as to communicate with another device via the network. For example, under the control of the recorder controller 1226, the communication unit 1235 communicates with a tuner (not shown) and outputs a channel-selection control signal mainly to the tuner.

The demodulator 1222 demodulates a signal supplied from the tuner and outputs the signal to the demultiplexer 1223.

The demultiplexer 1223 separates the data supplied from the demodulator 1222 into audio data, video data, and EPG data, and outputs the audio data, video data, and EPG data to the audio decoder 1224, the video decoder 1225, and the recorder controller 1226, respectively.

The audio decoder 1224 decodes the input audio data and outputs the data to the recording/playback unit 1223. The video decoder 1225 decodes the input video data and outputs the data to the display converter 1230. The recorder controller 1226 supplies the input EPG data to the EPG data memory 1227 and allows the EPG memory 1227 to store the EPG data therein.

The display converter 1230 encodes the video data supplied from the video decoder 1225 or the recorder controller 1226 into, for example, NTSC (National Television Standards Committee) video data, by using the video encoder 1241, and outputs the video data to the recording/playback unit 1233. The display converter 1230 also converts the size of the video data supplied from the video decoder 1225 or the recorder controller 1226 into a monitor size that matches the size of the monitor 1260. The display converter 1230 then converts the video data into NTSC video data and converts the data into an analog signal by using the video encoder 1241, and outputs the analog signal to the display controller 1232.

The display controller 1232 superposes an OSD signal output from the OSD (On Screen Display) controller 1231 on the video signal received from the display converter 1230 under the control of the recorder controller 1226. The display controller 1232 outputs the superposed signal to the display of the monitor 1260 and displays the superposed signal on the display.

An analog signal converted from audio data output from the audio decoder 1224 by the D/A converter 1234 is also supplied to the monitor 1260. The monitor 1260 outputs this audio signal from a built-in speaker.

The recording/playback unit 1233 has a hard disk as a storage medium that records video data, audio data, etc. therein.

The recording/playback unit 1233 encodes, for example, audio data supplied from the audio decoder 1224, by using the encoder 1251. The recording/playback unit 1233 also encodes video data supplied from the video encoder 1241 of the display converter 1230 by using the encoder 1251. The recording/playback unit 1233 combines the encoded data of the audio data with the encoded data of the video data by using a multiplexer. The recording/playback unit 1233 performs channel coding on the multiplexed data so as to amplify the data, and writes the multiplexed data into the hard disk via a recording head.

The recording/playback unit 1233 plays back data recorded on the hard disk via a playback head, amplifies the data, and separates the data into audio data and video data by using a demultiplexer. The recording/playback unit 1233 decodes the audio data and the video data by using the decoder 1252. The recording/playback unit 1233 performs D/A conversion on the decoded audio data and outputs the audio data to the speaker of the monitor 1260. The recording/playback unit 1233 also performs D/A conversion on the decoded video data and outputs the video data to the display of the monitor 1260.

The recorder controller 1226 reads out the latest EPG data from the EPG data memory 1227 on the basis of a user instruction represented by an infrared signal received from a remote controller by the receiver 1221, and supplies the latest EPG data to the OSD controller 1231. The OSD controller 1231 generates image data corresponding to the input EPG data and outputs the image data to the display controller 1232.

The display controller 1232 outputs the video data received from the OSD controller 1231 to the display of the monitor 1260, and displays the video data on the display. With this operation, EPG (Electronic Program Guide) is displayed on the display of the monitor 1260.

The hard disk recorder 1200 can also obtain various data, such as video data, audio data, and EPG data, supplied from other devices via a network, such as the Internet.

Under the control of the recorder controller 1226, the communication unit 1235 obtains encoded data, such as video data, audio data, and EPG data, sent from other devices via a network, and supplies the obtained data to the recorder controller 1226. The recorder controller 1226 supplies the obtained encoded data, such as video data and audio data, to the recording/playback unit 1233, and allows the recording/playback unit 1233 to store the encoded data in the hard disk. In this case, the recorder controller 1226 and the recording/playback unit 1233 may perform processing, such as re-encoding, if necessary.

The recorder controller 1226 decodes obtained encoded data, such as video data and audio data, and supplies the obtained video data to the display converter 1230. In a manner similar to video data supplied from the video decoder 1225, the display converter 1230 processes video data supplied from the recorder controller 1226 and supplies the video data to the monitor 1260 via the display controller 1232, thereby allowing the monitor 1260 to display the video data.

In combination with the display of images, the recorder controller 1226 may supply decoded audio data to the monitor 1260 via the D/A converter 1234, and allows the monitor 1260 to output the sound from the speaker.

Further, the recorder controller 1226 decodes the encoded data of the obtained EPG data and supplies the decoded EPG data to the EPG data memory 1227.

The hard disk recorder 1200 described above uses the image decoding apparatus 60 as the video decoder 1225, the decoder 1252, and the decoder contained in the recorder controller 1226. That is, as in the image decoding apparatus 60, in the video decoder 1225, the decoder 1252, and the decoder contained in the recorder controller 1226, by focusing the fact that a block adjacent to a target block and a block adjacent to a reference block have high correlation, the pixel values of the block adjacent to the reference block are input, and the result obtained by performing filter processing on the pixel values of the block adjacent to the target block is output. Then, a filter coefficient is calculated so that the minimum (mean) square error between the input and the output becomes minimum. Accordingly, the video decoder 1225, the decoder 1252, and the decoder contained in the recorder controller 1226 can calculate high-precision filter coefficients while suppressing an increase in the amount of encoding accompanied by the transmission of filter coefficients in an encoder.

Thus, when, for example, receiving video data (encoded data) by a tuner or the communication unit 1235 or when, for example, playing back video data (encoded data) from the hard disk by the recording/playback unit 1233, the hard disk recorder 1200 can suppress an increase in the amount of encoding and the overhead accompanied by the transmission of filter coefficients.

Also, the hard disk recorder 1200 uses the image encoding apparatus 40 as the encoder 1251. Accordingly, as in the case of the image encoding apparatus 40, in the encoder 1251, by focusing the fact that a block adjacent to a target block and a block adjacent to a reference block have high correlation, the pixel values of the block adjacent to the reference block are input, and the result obtained by performing filter processing on the pixel values of the block adjacent to the target block is output. Then, a filter coefficient is calculated so that the minimum (mean) square error between the input and the output becomes minimum. Accordingly, the encoder 1251 enables a decoder to calculate high-precision filter coefficients while suppressing an increase in the amount of encoding accompanied by the transmission of filter coefficients.

Thus, the hard disk recorder 1200 can suppress an increase in the amount of encoding and the overhead accompanied by the transmission of filter coefficients when, for example, recording encoded data in the hard disk.

The hard disk recorder 1200 that records video data or audio data in the hard disk has been described as an example using the present invention. However, of course, any type of recording medium may be used. For example, a recorder using a recording medium other than a hard disk, such as a flash memory, an optical disc, or a video tape, may be used. In this case, too, as in the case of the above-described hard disk recorder 1200, the image encoding apparatus 40 and the image decoding apparatus 60 is applicable to such a recorder.

Figure 21:
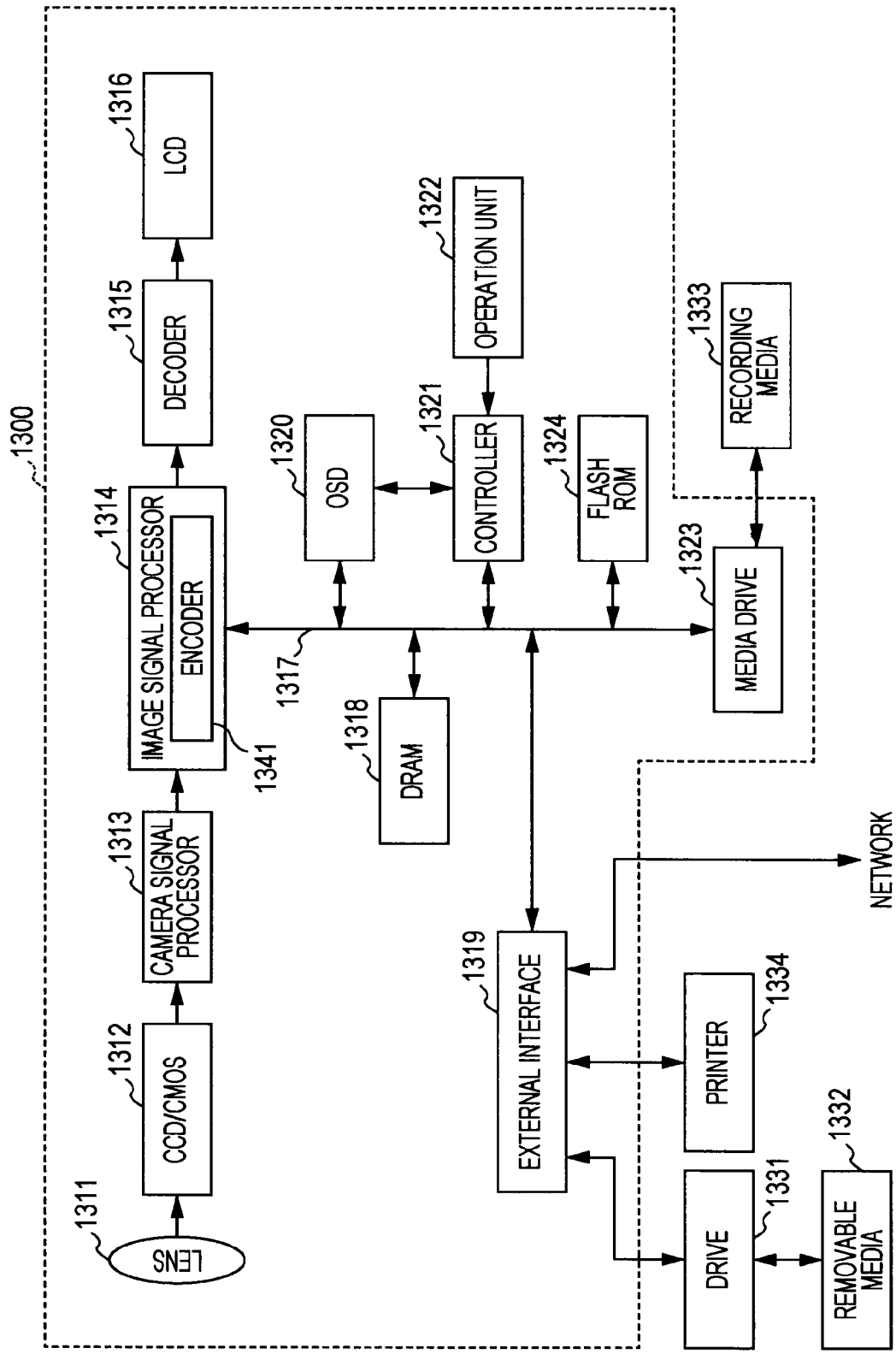
FIG. 21 is a block diagram illustrating an example of the major configuration of a camera to which the present invention is applied.

FIG. 21 is a block diagram illustrating an example of the major configuration of a camera using an image encoding apparatus and an image decoding apparatus to which the present invention is applied.

A camera 1300 shown in FIG. 21 captures an image of a subject, and displays the image of the subject on an LCD 1316 or records the image of the subject on recording media 1333 as image data.

A lens block 1311 allows light (i.e., an image of a subject) to be incident on a CCD/CMOS 1312. The CCD/CMOS 1312, which is an image sensor using a CCD or a CMOS, converts the intensity of the received light into an electric signal and supplies the electric signal to a camera signal processor 1313.

The camera signal processor 1313 converts the electric signal supplied from the CCD/CMOS 1312 into color difference signals Y, Cr, Cb, and supplies the color difference signals to an image signal processor 1314. Under the control of a controller 1321, the image signal processor 1314 performs predetermined image processing on the image signals supplied form the camera signal processor 1313 and encodes the image signals by using an encoder 1341. The image signal processor 1314 supplies the encoded data obtained by encoding the image signals to a decoder 1315. Further, the image signal processor 1314 obtains display data generated by an on screen display (OSD) 1320 and supplies the display data to the decoder 1315.

In the above-described processing, if necessary, the camera signal processor 1313 utilizes a DRAM (Dynamic Random Access Memory) 1318 that is connected to the camera signal processor 1313 via a bus 1317, and stores image data or encoded data obtained by encoding that image data, etc. in the DRAM 1318 if necessary.

The decoder 1315 decodes the encoded data supplied form the image signal processor 1314 and supplies the obtained image data (decoded image data) to the LCD 1316. The decoder 1315 also supplies the display data supplied from the image signal processor 1314 to the LCD 1316. The LCD 1316 suitably combines the image of the decoded image data with the image of the display data supplied from the decoder 1315, and displays the synthesized image.

The on screen display 1320 outputs menu screens including signs, characters, graphics, etc., or display data, such as icons, to the image signal processor 1314 via the bus 1317 under the control of the controller 1321.

The controller 1321 executes various operations on the basis of a signal representing the content of a command given by a user using an operation unit 1322, and also controls the image signal processor 1314, the DRAM 1318, an external interface 1319, the on screen display 1320, a media drive 1323, etc. via the bus 1317. In a FLASH ROM 1324, programs, data, etc. necessary for the controller 1321 to execute various operations are stored.

For example, in place of the image signal processor 1314 or the decoder 1315, the controller 1321 can encode image data stored in the DRAM 1318 or decode encoded data stored in the DRAM 1318. In this case, the controller 1321 may perform encoding and decoding processing according to methods similar to the encoding method and the decoding method employed in the image signal processor 1314 and the decoder 1315, respectively. Alternatively, the controller 1321 may perform encoding and decoding processing according to methods that are not supported by the image signal processor 1314 or the decoder 1315.

Also, for example, when an instruction to start printing an image is given from the operation unit 1322, the controller 1321 reads image data from the DRAM 1318 and supplies the image data to a printer 1334 that is connected to the external interface 1319 via the bus 1317, thereby allowing the printer 1334 to print the image data.

Further, for example, when an instruction to record an image is given from the operation unit 1322, the controller 1321 reads encoded data from the DRAM 1318 and supplies the encoded data to the recording media 1333 that are attached to the media drive 1323 via the bus 1317, thereby allowing the recording media 1333 to store the encoded data therein.

The recording media 1333 are arbitrary rewritable removable media, such as magnetic disks, magneto-optical disks, optical discs, semiconductor memories, or the like. Of course, any types of removable media may be used as the recoding media 1333, for example, tape devices, disks, or memory cards may be used. Of course, for example, non-contact IC cards may be used.

Alternatively, the media drive 1323 and the recording media 1333 may be integrated, and non-portable recording media, for example, a built-in hard disk drive or an SSD (Solid State Drive), may be used.

The external interface 1319 is formed of, for example, a USB input/output terminal, and is connected to the printer 1334 when printing images. A drive 1331 is connected to the external interface 1319 if necessary, and removable media 1332, such as magnetic disks, optical discs, magneto-optical disks, etc. are attached to the drive 1331 when necessary. A computer program read from the removable media 1332 is installed in the FLASH ROM 1324 if necessary.

Further, the external interface 1319 has a network interface connected to a predetermined network, such as a LAN or the Internet. In response to an instruction from the operation unit 1322, the controller 1321 reads encoded data from the DRAM 1318 and supplies the encoded data from the external interface 1319 to another device connected to the external interface 1319 via a network. The controller 1321 can also obtain via the external interface 1319 encoded data or image data supplied from another device via a network, and stores the data in the DRAM 1318 or supplies the data to the image signal processor 1314.

The camera 1300 described above uses the image decoding apparatus 60 as the decoder 1315. That is, as in the case of the image decoding apparatus 60, in the decoder 1315, by focusing the fact that a block adjacent to a target block and a block adjacent to a reference block have high correlation, the pixel values of the block adjacent to the reference block are input, and the result obtained by performing filter processing on the pixel values of the block adjacent to the target block is output. Then, a filter coefficient is calculated so that the minimum (mean) square error between the input and the output becomes minimum. Accordingly, as in the case of the image decoding apparatus 60, the decoder 1315 can calculate high-precision filter coefficients while suppressing an increase in the amount of encoding accompanied by the transmission of filter coefficients in an encoder.

Thus, when, for example, reading image data generated in the CCD/CMOS 1312 or reading encoded data of video data from the DRAM 1318 or the recording media 1333, or when, for example, obtaining encoded data of video data via a network, the camera 1300 can suppress an increase in the amount of encoding and the overhead accompanied by the transmission of filter coefficients.

Also, the camera 1300 uses the image encoding apparatus 40 as the encoder 1341. As in the case of the image encoding apparatus 40, in the encoder 1341, by focusing the fact that a block adjacent to a target block and a block adjacent to a reference block have high correlation, the pixel values of the block adjacent to the reference block are input, and the result obtained by performing filter processing on the pixel values of the block adjacent to the target block is output. Then, a filter coefficient is calculated so that the minimum (mean) square error between the input and the output becomes minimum. Accordingly, the encoder 1341 can allow a decoder to calculate high-precision filter coefficients while suppressing an increase in the amount of encoding accompanied by the transmission of filter coefficients.

Thus, the camera 1300 can suppress an increase in the amount of encoding accompanied by the transmission of filter coefficients when, for example, recording encoded data on the DRAM 1318 or the recording media 1333 or when, for example, providing encoded data to another device.

A decoding method employed in the image decoding apparatus 60 may be applied to decoding processing performed by the controller 1321. Similarly, an encoding method employed in the image encoding apparatus 40 may be applied to encoding processing performed by the controller 1321.

Image data captured by the camera 1300 may be moving images or still images.

Of course, the image encoding apparatus 40 and the image decoding apparatus 60 may be applicable to apparatuses or systems other than the above-described apparatuses.

Also, the size of a macroblock is arbitrary. The present invention may be applicable to any size of macroblock, such as those shown in FIG. 22. For example, the present invention can be applied, not only to normal 16×16-pixel macroblocks, but also to extended macroblocks, such as 32×32-pixel macroblocks.

In FIG. 22, in the top section, 32×32-pixel macroblocks, which are divided into blocks (partitions) of 32×32 pixels, 32×16 pixels, 16×32 pixels, and 16×16 pixels, are sequentially shown from the left in that order. Also, in the middle section, 16×16-pixel macroblocks, which are divided into blocks of 16×16 pixels, 16×8 pixels, 8×16 pixels, and 8×8 pixels, are sequentially shown from the left in that order. Further, in the bottom section, 8×8-pixel macroblocks, which are divided into blocks of 8×8 pixels, 8×4 pixels, 4×8 pixels, and 4×4 pixels, are sequentially shown from the left in that order.

That is, a 32×32-pixel macroblock may be processed in the blocks of 32×32 pixels, 32×16 pixels, 16×32 pixels, and 16×16 pixels shown in the top section.

The 16×16-pixel macroblock shown at the right side of the top section can be processed in the blocks of 16×16 pixels, 16×8 pixels, 8×16 pixels, and 8×8 pixels shown in the middle section, as in the H.264/AVC method.

The 8×8-pixel macroblock shown at the right side of the middle section can be processed in the blocks of 8×8 pixels, 8×4 pixels, 4×8 pixels, and 4×4 pixels shown in the bottom section, as in the H.264/AVC method.

These blocks can be classified into the following three levels. That is, the blocks of 32×32 pixels, 32×16 pixels, and 16×32 pixels shown in the top section of FIG. 22 are referred to as a first level. The block of 16×16 pixels shown at the right side of the top section and the blocks of 16×16 pixels, 16×8 pixels, and 8×16 pixels shown in the middle section are referred to as a second level. The block of 8×8 pixels shown at the right side of the middle section and the blocks of 8×8 pixels, 8×4 pixels, 4×8 pixels, and 4×4 pixels shown in the bottom section are referred to as a third level.

With such a hierarchical structure, for 16×16-pixel blocks and blocks having smaller pixels, blocks having a larger size can be defined as a superset while maintaining compatibility with the H.264/AVC method.

For example, the image encoding apparatus 40 or the image decoding apparatus 60 may calculate a filter coefficient for each level. Also, for example, the image encoding apparatus 40 or the image decoding apparatus 60 may set, for the second level, the same filter coefficient as that for the first level, whose block size is larger than that of the second level. Further, for example, the image encoding apparatus 40 or the image decoding apparatus 60 may set the same filter coefficient used in the past for the same level.

As in the first or second level, macroblocks that are encoded by using a relatively large block size are less likely to contain high frequency components. In contrast, as in the third level, macroblocks that are encoded by using a relatively small block size are more likely to contain high frequency components.

Accordingly, filter coefficients are calculated separately for the individual levels having different block sizes, thereby making it possible to improve the performance of encoding which is suitable for the local characteristics of an image.

The number of taps may be varied according to the level.

Reference Signs List

40 image encoding apparatus, 41 motion-prediction/compensation unit, 42 filter generator, 60 image decoding apparatus, 70 motion-prediction/compensation unit, 71 filter generator

The invention claimed is:

1. A decoder comprising:
    setting circuitry configured to set, as a decoded region, a region of a decoding target image that is adjacent to a target block of the decoding target image, where the target block is a target to be decoded and the decoded region is decoded earlier than the target block, and to set, as a reference region, a region of a reference image that has a first positional relationship with a reference block of the reference image that is the same as a second positional relationship of the decoded region of the decoding target image with the target block of the decoding target image;
    calculating circuitry configured to calculate a filter coefficient of a filter that converts pixel values of the reference region set by the setting circuitry into pixel values of the decoded region set by the setting circuitry;
    interpolating circuitry configured to interpolate pixel values of the reference block by using an adjustment filter having the filter coefficient calculated by the calculating circuitry; and generating circuitry configured to generate a prediction image corresponding to the decoding target image by motion-compensating the reference block having the pixel values interpolated by the interpolating circuitry for the target block, wherein an edge of the reference region abuts an edge with the reference block in the reference image and an edge of the decoded region abuts an edge of the target block in the decoding target image.

2. The decoder according to claim 1, wherein the calculating circuitry is configured to calculate the filter coefficient so that a square error between the pixel values of the decoded region and a result obtained by performing filter processing on the pixel values of the reference region becomes minimum.

3. The decoder according to claim 2, wherein:
the decoded region includes a first decoded region and a second decoded region, which is positioned after the first decoded region in a scan order; the reference region includes a first reference region corresponding to the first decoded region and a second reference region corresponding to the second decoded region; and
the calculating circuitry is configured to calculate coefficients of filters in different directions for the first reference region and the first decoded region and for the second reference region and the second decoded region.

4. The decoder according to claim 3, wherein:
the scan order is a raster scan order; and
the calculating circuitry is configured to calculate a coefficient of a horizontal-direction filter for the first reference region and the first decoded region, and is configured to calculate a coefficient of a vertical-direction filter for the second reference region and the second decoded region.

5. The decoder according to claim 4, wherein the first decoded region and the second decoded region have the same size.

6. The decoder according to claim 5, wherein the filter is an AIF (Adaptive Interpolation Filter).

7. The decoder according to claim 1, further comprising:
receiving circuitry configured to receive an integer-precision motion vector between the target block and the reference block,
wherein the setting circuitry is configured to set the decoded region and the reference region on the basis of the motion vector received by the receiving circuitry.

8. A decoding method comprising:
setting, as a decoded region, a region of a decoding target image that is adjacent to a target block of the decoding target image, where the target block is a target to be decoded and the decoded region is decoded earlier than the target block, and setting, as a reference region, a region of a reference image that has a first positional relationship with a reference block of the reference image that is the same as a second positional relationship of the decoded region of the decoding target image with the target block of the decoding target image;
calculating, by a processor, a filter coefficient of a filter that converts pixel values of the set reference region into pixel values of the decoded region;
interpolating pixel values of the reference block by using an adjustment filter having the calculated filter coefficient; and
generating, by a processor, a prediction image corresponding to the decoding target image by motion-compensating the reference block having the interpolated pixel values for the target block, wherein
an edge of the reference region abuts an edge with the reference block in the reference image and an edge of the decoded region abuts an edge of the target block in the decoding target image.

9. An encoder comprising:
setting circuitry configured to set, as an encoded region, a region of an encoding target image that is adjacent to a target block of the encoding target image, where the target block is a target to be encoded and the encoded region is encoded earlier than the target block, and to set, as a reference region, a region of a reference image that has a first positional relationship with a reference block of the reference image that is the same as a second positional relationship of the encoded region of the encoding target image with the target block of the encoding target image, where the reference image has been encoded earlier than the encoding target image;
calculating circuitry configured to calculate a filter coefficient of a filter that converts pixel values of the reference region set by the setting circuitry into pixel values of the decoded region set by the setting circuitry;
interpolating circuitry configured to interpolate pixel values of the reference block by using an adjustment filter having the filter coefficient calculated by the calculating circuitry; and
generating circuitry configured to generate a prediction image corresponding to the encoding target image by motion-compensating the reference block having the pixel values interpolated by the interpolating circuitry for the target block, wherein
an edge of the reference region abuts an edge with the reference block in the reference image and an edge of the encoded region abuts an edge of the target block in the encoding target image.

10. The encoder according to claim 9, further comprising motion-vector calculating circuitry configured to calculate a motion vector between the target block and the reference block with an integer precision.

11. The encoder according to claim 9, wherein the filter is an AIF (Adaptive Interpolation Filter).

12. An encoding method comprising:
setting, as an encoded region, a region of an encoding target image that is adjacent to a target block of the encoding target image, where the target block is a target to be encoded and the encoded region is encoded earlier than the target block, and setting, as a reference region, a region of a reference image that has a first positional relationship with a reference block of the reference image that is the same as a second positional relationship of the encoded region of the encoding target image with the target block of the encoding target image, where the reference image has been encoded earlier than the encoding target image;
calculating, by a processor, a filter coefficient of a filter that converts pixel values of the set reference region into pixel values of the decoded region; interpolating pixel values of the reference block by using an adjustment filter having the calculated filter coefficient; and
generating, by a processor, a prediction image corresponding to the encoding target image by motion-compensating the reference block having the interpolated pixel values for the target block, wherein
an edge of the reference region abuts an edge with the reference block in the reference image and an edge of the encoded region abuts an edge of the target block in the encoding target image.

13. The decoder according to claim 1, wherein the reference region borders the reference block in the reference image and the decoded region borders the target block in the decoding target image.

14. The decoder according to claim 13, wherein the reference region is positioned above the reference block in the reference image and the decoded region is positioned above the target block in the decoding target image.

15. The decoder according to claim 13, wherein the reference region is positioned to the left of the reference block in the reference image and the decoded region is positioned to the left of the target block in the decoding target image.

* * * * *